United States Patent
Tabata et al.

(10) Patent No.: US 9,794,531 B2
(45) Date of Patent: Oct. 17, 2017

(54) IMAGE DISPLAY APPARATUS AND IMAGE DISPLAY ADJUSTING METHOD

(71) Applicant: JVC KENWOOD Corporation, Yokohama-shi, Kanagawa (JP)

(72) Inventors: Kiyofumi Tabata, Yokohama (JP); Tatsuya Nakano, Yokohama (JP)

(73) Assignee: JVC KENWOOD CORPORATION, Yokohama-Shi, Kanagawa (JP)

(*) Notice: Subject to any disclaimer, the term of this patent is extended or adjusted under 35 U.S.C. 154(b) by 0 days.

(21) Appl. No.: 15/276,266

(22) Filed: Sep. 26, 2016

(65) Prior Publication Data

US 2017/0013239 A1    Jan. 12, 2017

Related U.S. Application Data

(63) Continuation of application No. PCT/JP2015/001477, filed on Mar. 17, 2015.

(30) Foreign Application Priority Data

Mar. 28, 2014  (JP) .................. 2014-067975
Mar. 28, 2014  (JP) .................. 2014-067976

(Continued)

(51) Int. Cl.
*H04N 9/31*     (2006.01)
*B60K 35/00*    (2006.01)
(Continued)

(52) U.S. Cl.
CPC .......... *H04N 9/3135* (2013.01); *B60K 35/00* (2013.01); *G02B 26/10* (2013.01); *G02B 27/01* (2013.01);
(Continued)

(58) Field of Classification Search
CPC .. H04N 9/3135; H04N 9/3129; H04N 9/3155; H04N 9/3161; H04N 9/3185;
(Continued)

(56) References Cited

U.S. PATENT DOCUMENTS

2006/0255243 A1   11/2006  Kobayashi et al.
2015/0022898 A1    1/2015  Yamakawa et al.
(Continued)

FOREIGN PATENT DOCUMENTS

JP    2010-175671 A    8/2010
JP    2013-156314      8/2013

*Primary Examiner* — Sherrie Hsia
(74) *Attorney, Agent, or Firm* — Procopio, Cory, Hargreaves, Savitch LLP

(57) ABSTRACT

The rendering control unit controls the laser light source unit in such a way that a display image is rendered in a range smaller than a scan range of the scan mirror unit based on input display image data. The detection unit detects a range to be a reference for setting a laser beam output position for adjusting an output of the laser beams based on the display image data. The output adjusting control unit controls the laser light source unit in such a way that the laser beams for adjusting an output of the laser beams are output at a position outside the range where the display image is rendered in the scan range of the scan mirror unit, and the position is based on the range detected by the detecting unit.

11 Claims, 24 Drawing Sheets

(30) Foreign Application Priority Data

Dec. 15, 2014 (JP) ................................ 2014-252875
Dec. 15, 2014 (JP) ................................ 2014-252876

(51) Int. Cl.
*G02B 26/10* (2006.01)
*G02B 27/01* (2006.01)

(52) U.S. Cl.
CPC ......... *H04N 9/3155* (2013.01); *H04N 9/3161* (2013.01); *H04N 9/3185* (2013.01); *H04N 9/3194* (2013.01); *B60K 2350/1072* (2013.01); *G09G 2310/0235* (2013.01); *G09G 2360/16* (2013.01)

(58) Field of Classification Search
CPC ...... H04N 9/3188; H04N 9/3194; H04N 9/31; G02B 26/10; G02B 27/01; G09G 2310/0235; G09G 2360/16; B60K 35/00; B60K 2350/1072
USPC ....... 348/745, 739, 744, 750, 752, 787, 789, 348/792, 836
See application file for complete search history.

(56) References Cited

U.S. PATENT DOCUMENTS

2015/0092118 A1* 4/2015 Hada ...................... G02B 27/01
 349/11
2016/0342076 A1* 11/2016 Katou .................. H04N 9/3129

\* cited by examiner

IMAGE DISPLAY APPARATUS AND IMAGE DISPLAY ADJUSTING METHOD

CROSS REFERENCE TO RELATED APPLICATION

The present application is a continuation of PCT Application No: PCT/JP2015/001477, filed on Mar. 17, 2015, which claims the benefit of priority from Japanese Patent Application No. 2014-067975, filed on Mar. 28, 2014, Japanese Patent Application No. 2014-067976, filed on Mar. 28, 2014, Japanese Patent Application No. 2014-252875, filed on Dec. 15, 2014, and Japanese Patent Application No. 2014-252876, filed on Dec. 15, 2014, the entire contents of which are hereby incorporated by reference.

BACKGROUND

The present invention relates to an image display apparatus and an image display adjusting method.

Laser scanning image display apparatuses that reflect laser beams on Micro Electro Mechanical System (MEMS) mirrors to scan the laser beams and project images are well known. The image display apparatuses that project images on windshields or combiners of automobiles to present virtual images to a user, which are called Head Up Displays (HUD), are also well known.

Japanese Unexamined Patent Application Publication No. 2013-156314 discloses a technique that detects laser beams used in HUD from a state in which an invisible position inside an enclosure is irradiated with the laser beams and adjusts output values of the laser beams.

SUMMARY

Even when an enclosure and the like is used to block laser beams for adjusting the output values of the laser beams from leaking into a range in which an image will be rendered in order to adjust output values of the laser beams, and then the laser beams are emitted, the laser beams reflected inside the enclosure scatter as stray light and may influence a rendered image. For example, when the image display apparatus is used as HUD mounted on a vehicle, and images are rendered in an environment with low peripheral brightness such as at nighttime, an influence of the stray light may become large enough to be noticeable.

An image display apparatus according to the exemplary embodiment includes: a laser light source unit; a scan mirror unit configured to reflect laser beams output from the laser light source unit and scan the light beams; a rendering control unit configured to control the laser light source unit in such a way that a display image is rendered in a range being smaller than a scan range of the scan mirror unit based on input display image data; a detecting unit configured to detect a range to be a reference for setting a laser beam output position for adjusting an output of the laser beams based on the display image data; and an output adjusting control unit configured to control the laser light source unit in such a way that the laser beams for adjusting the output of the laser beams are output at a position outside the range where the display image is rendered in the scan range of the scan mirror unit, and the position is based on the range detected by the detecting unit.

An image display adjusting method according to the exemplary embodiment includes: a detecting step for detecting a range to be a reference for setting a laser beam output position for adjusting an output of the laser beams based on input display image data; a rendering control step for controlling a laser light source unit in such a way that a display image is rendered in a range smaller than a scan range of a scan mirror unit configured to scan by reflecting laser beams output from the laser light source unit, based on the display image data; and an output adjusting control step for controlling the laser light source unit in such a way that the laser beams for adjusting the output of the laser beams are output at a position outside the range where the display image is rendered in the rendering control step, and the position is based on the range detected in the detecting step.

DETAILED DESCRIPTION

Figure 1:
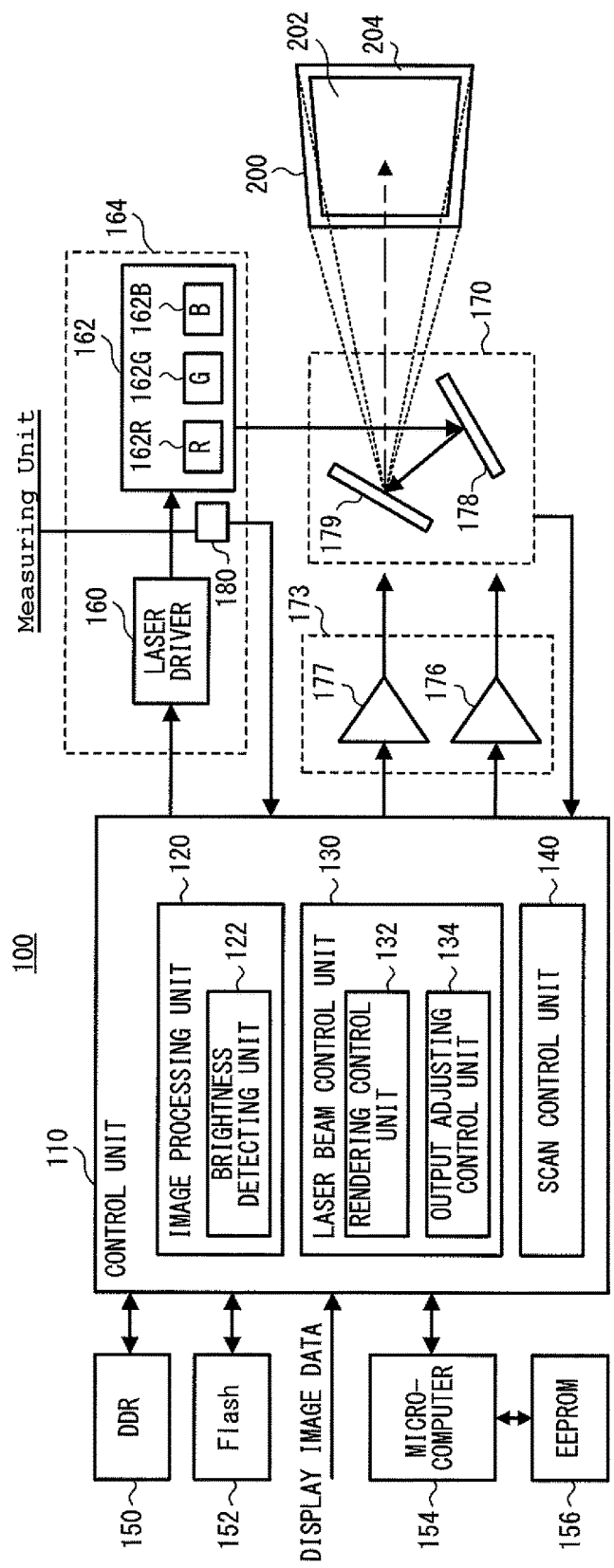
FIG. 1 is a block diagram showing a configuration of an image display apparatus according to a first exemplary embodiment of the present invention.

Hereinafter, a first exemplary embodiment of the present invention will be explained. FIG. 1 is block diagram showing a configuration of an image display apparatus 100 according to the first exemplary embodiment of the present invention. Specifically, the image display apparatus 100 is a head up display apparatus that is mostly mounted on a vehicle and presents various information items as virtual images to a driver or the like who is a user.

When the image display apparatus 100 is used as a head up display apparatus, images presented as the virtual images are images intended for route guidance, images intended for warning, images based on content playback, images related to various User Interfaces (UIs) and the like. These images may either be still images or moving images.

The image display apparatus 100 includes a control unit 110, a DDR (Double Data Rate) memory 150, a flash memory 152, a microcomputer 154, an EEPROM (Electrically Erasable and Programmable Read Only Memory) 156, a laser driver 160, laser diodes 162, a scan mirror unit 170, a scanner driver 173, and a measuring unit 180.

The control unit 110 includes a CPU (Central Processing Unit), an FPGA (Field Programmable Gate Array) and the like. The control unit 110 operates a program stored in the flash memory 152, the EEPROM 156 and the like and performs various processes. The control unit 110 includes an image processing unit 120, a laser beam control unit 130, and a scan control unit 140 as functions operated by the program. Display image data is input to the control unit 110.

The DDR memory 150 is a frame buffer that temporarily stores image data input to the image processing unit 120. The DDR memory 150 may be a DDR2, DDR3, or other SDRAMs (Synchronous Dynamic Random Access Memories).

The flash memory 152 is a non-volatile storage unit that stores data and programs necessary for an operation of the image processing unit 120.

The microcomputer 154 controls the scan control unit 140 to generate driving signals for operating the scanner driver 173. The EEPROM 156 is a non-volatile storage unit that stores data and programs necessary for operating the scan control unit 140.

The image processing unit 120 outputs the image data input from the DDR memory 150 to the laser beam control unit 130 and the scan control unit 140 to match predetermined dot clocks in order to enable the laser beam control unit 130 to drive laser beams based on the image data.

A brightness detecting unit 122 detects a range with high brightness (i.e. luminance) from the image data input from the DDR memory 150. To be more specific, the brightness detecting unit 122 partitions the image data and obtains brightness for each partition to thereby detect a partition with high brightness. A brightness detecting process performed by the brightness detecting unit 122 will be described later.

The laser beam control unit 130 controls the laser driver 160 so that the laser diodes 162 output laser beams appropriately based on the image data input from the DDR memory 150. The laser beam control unit 130 includes a rendering control unit 132 and an output adjusting control unit 134 that are based on the above function.

The rendering control unit 132 controls the laser driver 160 so that the laser beams are output at appropriate timings and with appropriate output values based on the image data input from the DDR memory 150. To be more specific, the rendering control unit 132 controls the laser driver 160 to turn on or off each of the laser diodes 162 and controls laser output values so that an image based on the image data is rendered. Further, the rendering control unit 132 controls the laser driver 160 so that display images are rendered in a range smaller than a scan range 200 of a scan mirror unit 170 which will be described later.

The output adjusting control unit 134 performs control to execute output value adjustment (hereinafter referred to as APC (Auto Power Control)) of the laser beams output from the laser diodes 162. More specifically, the output adjusting control unit 134 controls the laser driver 160 to output laser beams for APC in a blanking area 204 which is outside a range where the display images are rendered in the scan range 200 of the scan mirror unit 170. Moreover, the output adjusting control unit 134 controls the laser driver 160 to output the laser beams for APC near the range with high brightness that has been detected by the brightness detecting unit 122.

The scan control unit 140 controls oscillation angles, scan frequencies and the like of a horizontal scan mirror 178 and a vertical scan mirror 179 that constitute the scan mirror unit 170. The scan control unit 140 generates waveforms of driving voltages so that the scan mirror unit 170 obtains desired oscillation angles, frequencies and the like and supplies the driving voltages to the scanner driver 173.

The laser driver 160 drives the laser diodes 162 according to the control by the laser beam control unit 130. To be more specific, the laser driver 160 drives the laser diode 162 at lightning timings and with driving currents according to the control by the laser beam control unit 130. When the laser diode 162 includes a plurality of diodes, the laser driver 160 drives each of the laser diodes.

The laser diodes 162 output laser beams which are light sources. Although the laser diodes 162 includes a red laser diode 162R, a green laser diode 162G, and a blue laser diode 162B, laser diodes that output laser beams in other colors may be added or the laser diode 162 may include a single laser diode.

A laser light source unit 164 is a module that includes the laser driver 160 and the laser diodes 162, mirrors for guiding light paths of the laser beams output from each of the red laser diode 162R, the green laser diode 162G, and the blue laser diode 162B in order to combine these laser beams, and a mirror for guiding the laser beams to the scan mirror unit 170.

By the laser beam control unit 130 controlling the laser driver 160, driving currents and driving times of the respective laser diodes are controlled, and the laser beams output from the laser diodes 162 can present various rendering colors and rendering modes.

Figure 2:
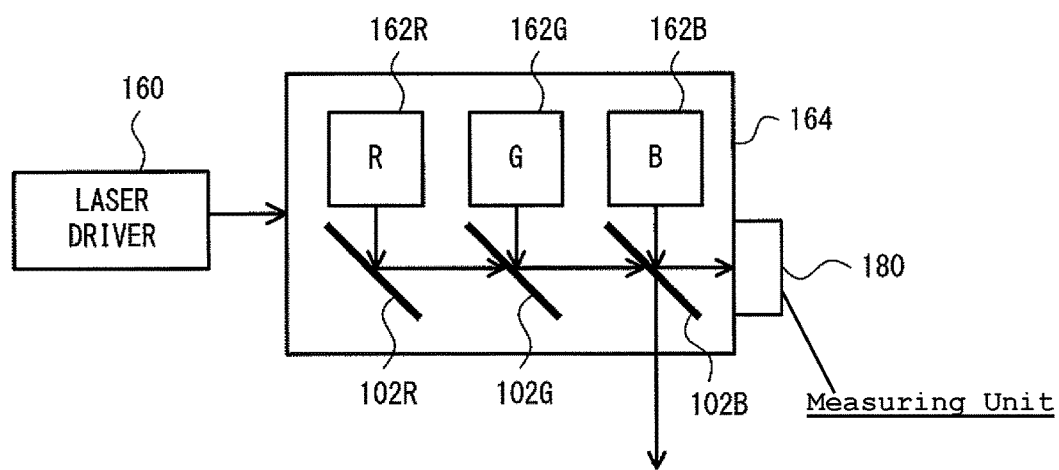
FIG. 2 is a drawing schematically showing a configuration to measure a quantity of light of laser beams of the image display apparatus according to the present invention.

The measuring unit 180 is a photodiode that measures a quantity of light of the laser beams output from the laser diodes 162. FIG. 2 shows a configuration of the laser light source unit 164 and the measuring unit 180.

FIG. 2 shows a configuration in which the measuring unit 180 detects the laser beams of the respective red laser diode 162R, green laser diode 162G, and blue laser diode 162B that are included in the laser light source unit 164. The measuring unit 180 may be configured as a part of the laser light source unit 164.

The laser light source unit 164 includes dichroic mirrors 102 that guide the laser beams output from the respective laser diodes 162 to both the scan mirror unit 170 and the measuring unit 180.

The dichroic mirror 102R has a characteristic of reflecting almost 100% of laser beams of a red wavelength. Therefore, the dichroic mirror 102R reflects almost 100% of the laser beams output from the red laser diode 162R and guides the reflected laser beams to the dichroic mirror 102G. The red laser diode 162R may be arranged in such a way that the laser beams are directly output to the dichroic mirror 102G without using the dichroic mirror 102R.

The dichroic mirror 102G has a characteristic of transmitting almost 100% of the laser beams of the red wavelength and reflecting almost 100% of laser beams of a green wavelength. Therefore, the dichroic mirror 102G transmits almost 100% of the laser beams output from the red laser diode 162R and guides the transmitted laser beams to the dichroic mirror 102B, reflects almost 100% of the laser beams output from the green laser diode 162G, and guides the reflected laser beams to the dichroic mirror 102B.

The dichroic mirror 102B has a characteristic of reflecting about 98% of the laser beams of the red wavelength and the laser beams of the green wavelength and transmitting the remaining about 2% of the laser beams of the red wavelength and the laser beams of the green wavelength, and also transmitting about 98% of the laser beams of a blue wavelength and reflecting the remaining about 2% of the laser beams of the blue wavelength. Therefore, the dichroic mirror 102B reflects about 98% of the laser beams output from the red laser diode 162R and the green laser diode 162G and guides the reflected laser beams to the scan mirror unit 170, and also transmits about 2% of the laser beams output from the red laser diode 162R and the green laser diode 162G and guides the transmitted laser beams to the measuring unit 180. Moreover, the dichroic mirror 102B transmits about 98% of the laser beams output from the blue laser diode 162B and guides the transmitted laser beams to the scan mirror unit 170, and also reflects about 2% of the laser beams output from the blue laser diode 162B and guides the reflected laser beams to the measuring unit 180.

With such a configuration, about 98% of the laser beams output from the laser diodes 162 are directed to the scan mirror unit 170, while remaining 2% of the laser beams are received by the measuring unit 180, and the measuring unit 180 detects a quantity of light of the received laser beams. As the quantity of light of the laser beams entering the measuring unit 180 which is detected by the measuring unit 180 is proportional to the quantity of light of the laser beams output from the respective laser diodes 162, the measuring unit 180 can measure the quantity of output light of each of the laser diodes 162.

Referring again to FIG. 1, the scanner driver 173 operates scan mirrors that constitute the scan mirror unit 170 according to the control by the scan control unit 140. In this exemplary embodiment, as the horizontal scan mirror 178 and the vertical scan mirror 179 are included in the scan mirror unit 170, the scanner driver 173 includes the horizontal scanner driver 176 and the vertical scanner driver 177.

By the control of the scan control unit 140, the horizontal scanner driver 176 supplies the driving voltage for oscillating the horizontal scan mirror 178 at a predetermined frequency to the horizontal scan mirror 178. By the control of the scan control unit 140, the vertical scanner driver 177 supplies the driving voltage for oscillating the vertical scan mirror 179 at a predetermined frequency to the vertical scan mirror 179.

The scan mirror unit 170 reflects the laser beams output from the laser light source unit 164 while oscillating at a predetermined frequency in order to render a display image. The scan mirror unit 170 includes the horizontal scan mirror 178 that performs scanning corresponding to a horizontal direction of the display image and the vertical scan mirror 179 that performs scanning corresponding to a vertical direction of the display image.

The horizontal scan mirror 178 scans the laser beams output from the laser light source unit 164 in the horizontal direction according to the driving voltage in the horizontal direction that is supplied by the image processing unit 120. The horizontal scan mirror 178 is an MEMS mirror or the like that is formed by performing processing such as etching on an SOI (Silicon On Insulator) substrate. The horizontal scan mirror 178 includes a piezoelectric element. When the driving voltage supplied from the horizontal scanner driver 176 drives the piezoelectric element, the horizontal scan mirror 178 is oscillated at the predetermined frequency.

The vertical scan mirror 179 scans the laser beams scanned by the horizontal scan mirror 178 in the vertical direction according to the driving voltage in the vertical direction that is supplied by the image processing unit 120. The vertical scan mirror 179 has a configuration that includes a silicon mirror and the like and a drive coil on a flexible substrate. The driving voltage supplied from the vertical scanner driver 177 is applied to the drive coil of the vertical scan mirror 179, and the vertical scan mirror 179 is oscillated at the predetermined frequency by a magnetic force of a magnet (not shown).

Moreover, the horizontal scan mirror 178 and the vertical scan mirror 179 detect the oscillation angles and frequencies by piezoelectric films, Hall elements and the like included therein. The scan control unit 140 obtains the detected oscillation angles and frequencies and feeds them back in scan control.

Although it has been explained that the light paths for the laser beams output from the laser light source unit 164 are such that after the laser beams are scanned by the horizontal scan mirror 178, the laser beams are scanned by the vertical scan mirror 179, the order of scanning performed by the horizontal scan mirror 178 and the vertical scan mirror 179 may be reversed. Further, the vertical scan mirror and the horizontal scan mirror may be an integrated mirror.

A range over which the laser beams can be scanned by the scanning performed by the horizontal scan mirror 178 and the vertical scan mirror 179 will be referred to as the scan range 200. In the scan range 200, a range in which the display image is rendered will be referred to as a rendering area 202, and a range other than the rendering area 202 in the scan range 200 will be referred to as the blanking area 204.

Figure 3:
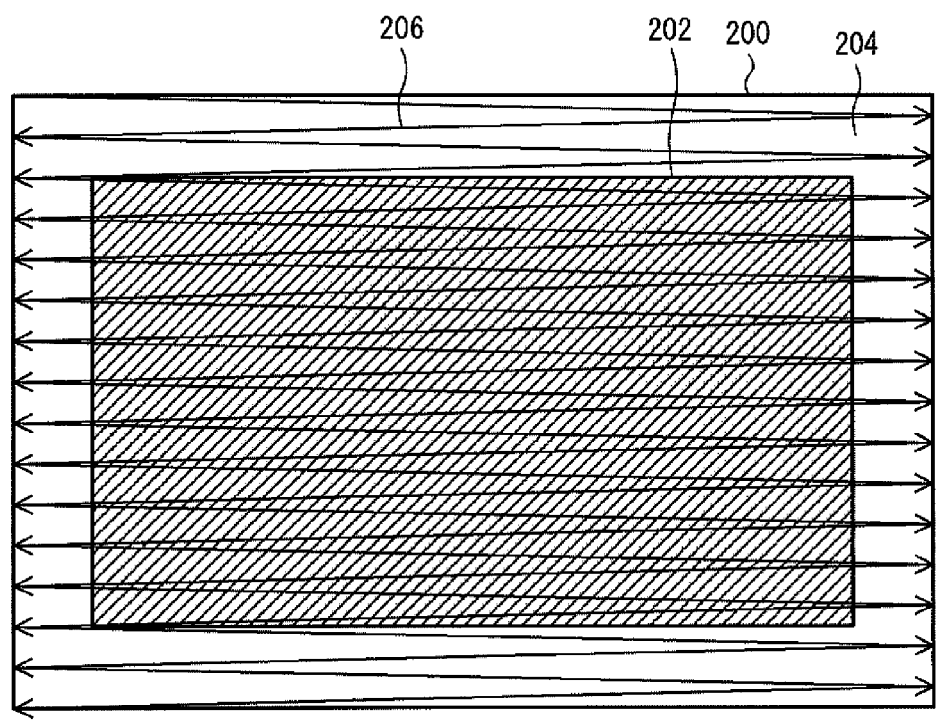
FIG. 3 is a drawing schematically showing a scan range by the image display apparatus according to the present invention.

Next, rendering of the display image in the scan range 200 will be explained by referring to FIG. 3. FIG. 3 is a drawing schematically showing the scan range. The scan range 200 is a range over which the laser beams can be scanned by the oscillation angles of the horizontal scan mirror 178 and the vertical scan mirror 179. By the oscillation of the horizontal scan mirror 178 and the vertical scan mirror 179, the laser beams are scanned in the vertical direction while being scanned horizontally as indicated by laser scan trajectories 206. As FIG. 3 is a schematic diagram, only some of the scans of the laser scan trajectories 206 are illustrated. However, in practice, the number of scans is determined by resolution per frame of the display image. To be more specific, for example, by the oscillation of the horizontal scan mirror 178, 240 cycles of reciprocation of the laser scan trajectories 206, namely, 480 laser scanning trajectories 206 in the horizontal direction for rendering of one frame are scanned. Further, as the oscillation of the vertical scan mirror 179 is a single reciprocation in the vertical direction for rendering of one frame, when scanning is performed for 60 cycles of reciprocation per second, an image of 60 frames per second is rendered.

The rendering area 202 is a range in which the laser beams are emitted in order to render the display image in the scan range 200. To be more specific, the laser beams are not emitted on the entire area of the rendering area 202, and the rendering control unit 132 controls output levels and light emitting timings of the respective red laser diode 162R, green laser diode 162G, and blue laser diode 162B according to a shape and colors of the display image in order to display the display image in the rendering area 202.

Although the blanking area 204 is not used to render the display image, laser beams for APC are output at predetermined scan positions in the blanking area 204. Hereinafter, the predetermined scan positions at which the laser beams for APC are output will be referred to as APC areas 208. The positions of the APC areas 208 will be described later.

As the image display apparatus 100 according to the present invention is used for head up displays and the like, the laser beams in the rendering area 202 need to be projected to be visible for a user in order to present a virtual image to the user. However, the blanking area 204 in which the APC areas 208 are formed needs to be configured to be invisible to the user. Hereinafter, a structure that makes the blanking area 204 invisible to the user even when the laser beams are output in the blanking area 204 will be explained by referring to FIGS. 4 and 5.

Figure 4:
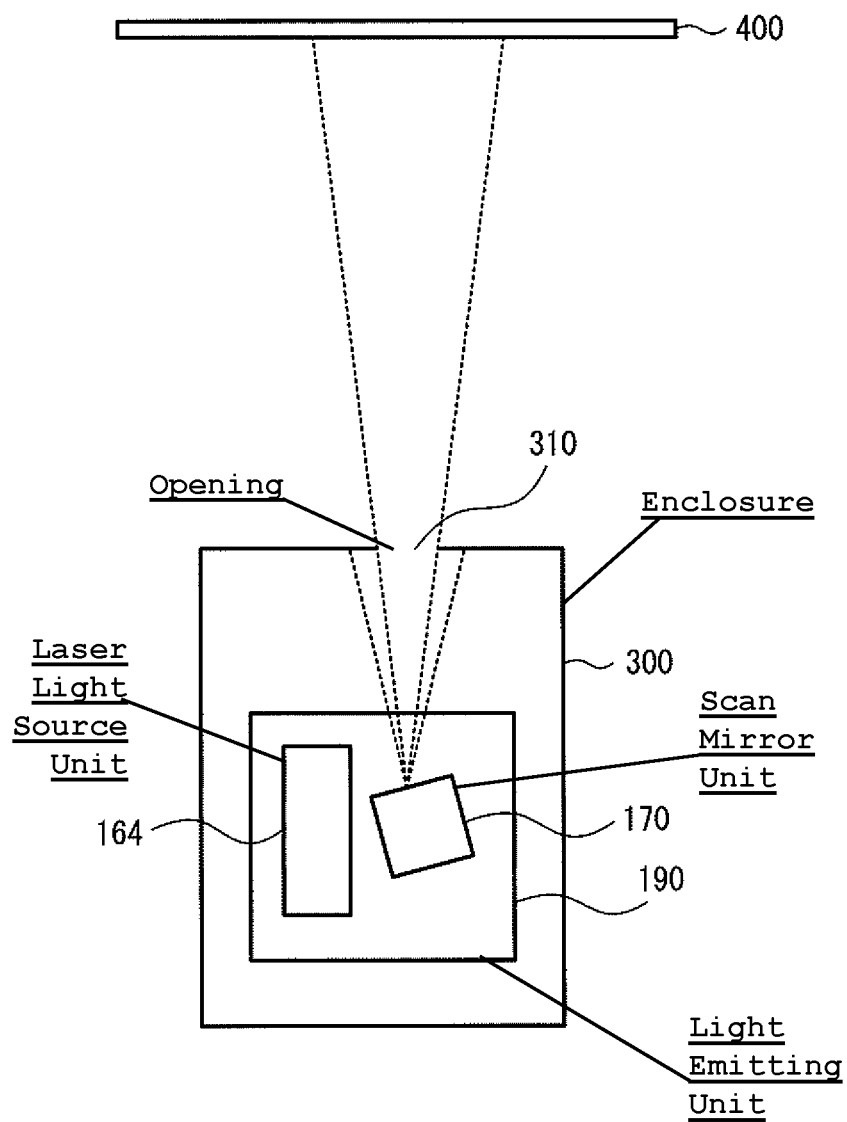
FIG. 4 is a drawing schematically showing a relationship between a light emitting unit and an enclosure of the image display apparatus and image scan light according to the present invention.

FIG. 4 is a top view schematically showing a relationship between a light emitting unit 190 of the image display apparatus 100 and an enclosure 300 that surrounds the light emitting unit 190 and a scan range of the laser beams. The light emitting unit 190 is a module included inside the image display apparatus 100 and includes the laser light source unit 164 and the scan mirror unit 170 as modules. As FIG. 4 is a schematic diagram, the laser beams output from the scan mirror unit 170 are illustrated as directly reaching a projection surface 400. However, in practice, the laser beams reach the projection surface through planar mirrors (not shown). The projection surface here indicates an intermediate image screen.

Figure 5:
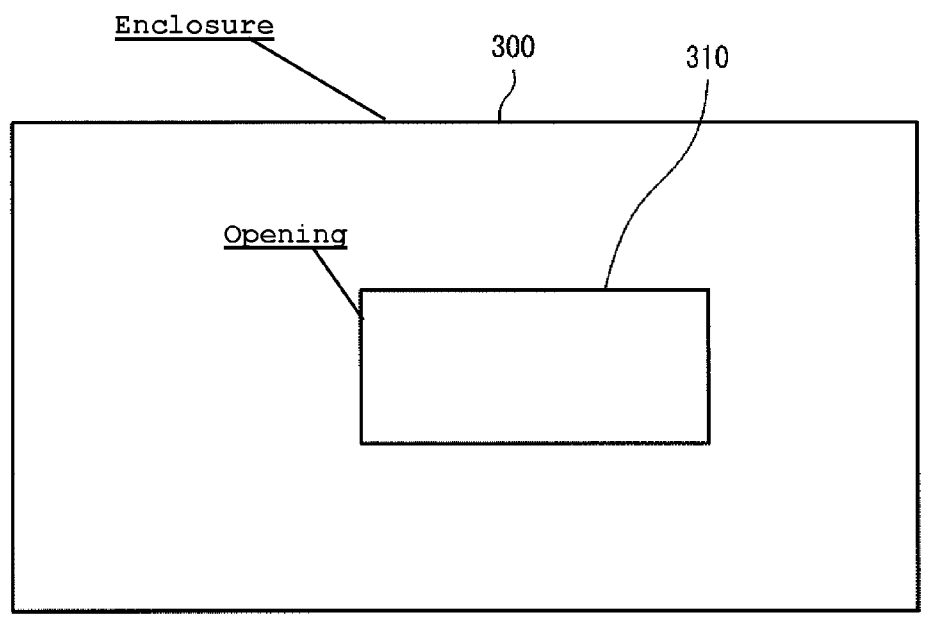
FIG. 5 is a drawing schematically showing a shape of an opening of the enclosure of the image display apparatus according to the present invention.

The enclosure 300 is formed in a shape of a box and made of metal plate or the like, and the light emitting unit 190 is placed inside the enclosure 300. The enclosure 300 has an opening 310 to be opened in a direction in which the laser beams scanned by the scan mirror unit 170 are emitted. A shape of the opening 310 is a rectangle as shown in FIG. 5 and matches or substantially matches a shape of the rendering area 202 at the position of the opening 310.

Among the laser beams scanned by the scan mirror unit 170, only the laser beams that are scanned over the rendering area 202 pass through the opening 310 and reach the projection surface 400. Further, the laser beams that are scanned over the blanking area 204 are blocked because the enclosure 300 is present in a direction in which the laser beams progress. Thus, the laser beams that are scanned over the blanking area 204 will not reach the projection surface 400. It is therefore configured in such a way that even when the laser beams are output at any position in the blanking area 204, the laser beams are blocked by the enclosure 300 and become invisible to the user. However, as described above, the laser beams output in the blanking area 204 are reflected at a position close to the opening 310 of the enclosure 300. For this reason, reflected stray light influences the display image of the rendering area 202 that has passed through the opening 310.

Next, an operation of APC according to the first exemplary embodiment will be explained by referring to FIGS. 6 to 11.

Figure 6:
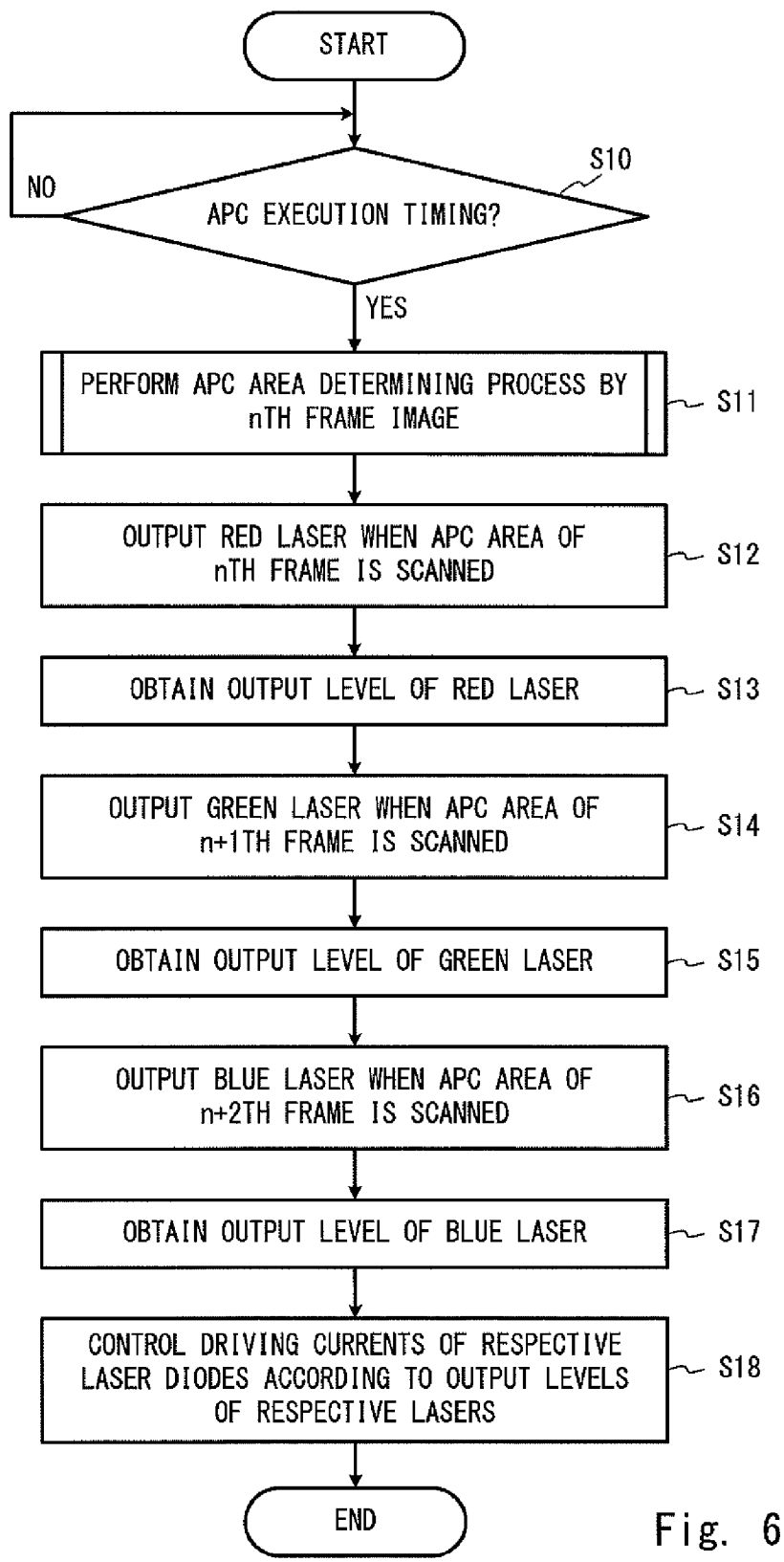
FIG. 6 is a flowchart for explaining an output adjusting operation performed by the image display apparatus according to the first exemplary embodiment of the present invention.

FIG. 6 is a flowchart for explaining the operation of APC performed by the image display apparatus 100. Firstly, the output adjusting control unit 134 evaluates as to whether or not it is a timing at which APC is executed (step S10). The timing at which APC is executed is arbitrary. To be more specific, APC is executed every predetermined time or every predetermined frame while an image is being displayed. The predetermined time and the predetermined frame are, for example, every 60 seconds and every 3600 frames, respectively. In addition, APC may be executed when the image display apparatus 100 is started. The timing when the image display apparatus 100 is started is a timing when adjustment by APC is most needed, for example, when a temperature of a usage environment of the image display apparatus 100 is low.

In the step S10, when it is evaluated that it is not a timing to execute APC (step S10: No), an evaluation in the step S10 is executed again. After the evaluation in the step S10 is determined to be No, a step for evaluating as to whether or not a predetermined time has passed may be included depending on setting of timings at which APC is executed. Alternatively, when the timing at which APC is executed is set after the image display apparatus 100 is started, the process of the step S10 may be skipped, and processes from the step S11 onward may be executed after the image display apparatus 100 is started.

In the step S10, when it is evaluated that it is a timing at which APC is executed (step S10: Yes), the output adjusting control unit 134 determines the APC areas according to a result of detection by the brightness detecting unit 122 based on a frame image (an nth frame image) that constitutes the display image displayed at an APC execution timing (step S11). The process of the step S11 will be explained by referring to FIG. 7.

Figure 7:
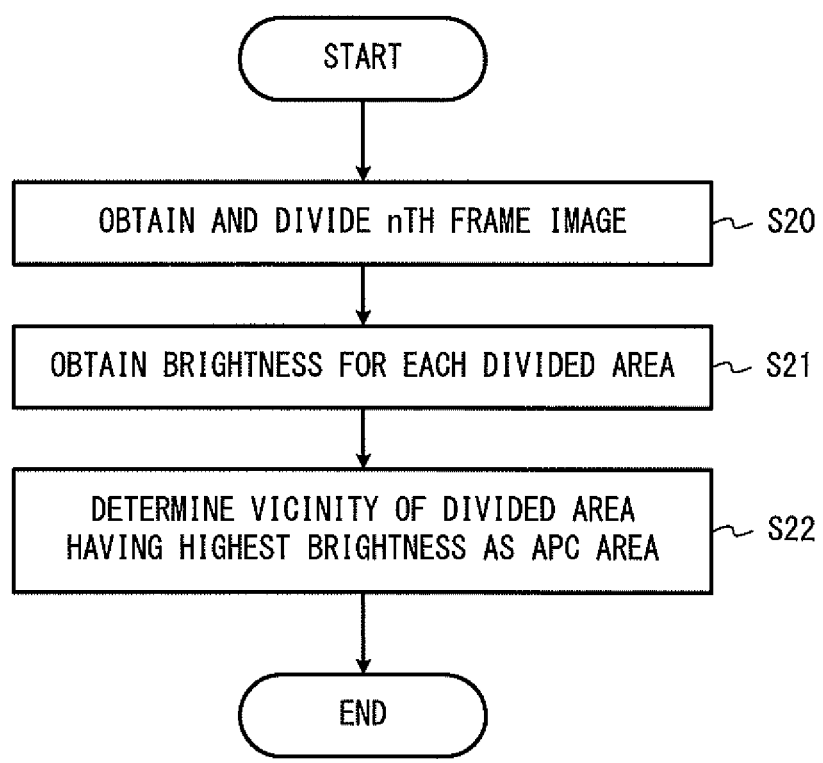
FIG. 7 is a flowchart for explaining an example of an APC area determining process performed by the image display apparatus according to the first exemplary embodiment of the present invention.

In FIG. 7, the brightness detecting unit 122 obtains a frame image immediately after the timing at which APC is executed in the step S10 and divides the frame image into predetermined divided areas (step S20). Although the division into the divided areas in the process of the step S20 is performed according to a predetermined division mode, the division mode may be changed as appropriate according to the contents of the display image.

After the process of the step S20, the brightness detecting unit 122 obtains brightness (i.e. lightness) for each of the divided areas (step S21). To be more specific, the brightness detecting unit 122 obtains brightness information for respective pixels constituting the display image and calculates a sum of the brightness for each of the divided areas. When areas of the divided areas differ from each other, by dividing the sum of the brightness for each divided area by an area ratio of the divided area or the number of pixels constituting the divided area, the sum of the brightness for each divided area can be used for an appropriate comparison.

Next, the output adjusting control unit 134 compares the brightness of the respective divided areas that has been obtained by the brightness detecting unit 122 in the process of the step S21 and determines vicinity of the most bright divided area as being the APC areas (step S22).

Figure 8:
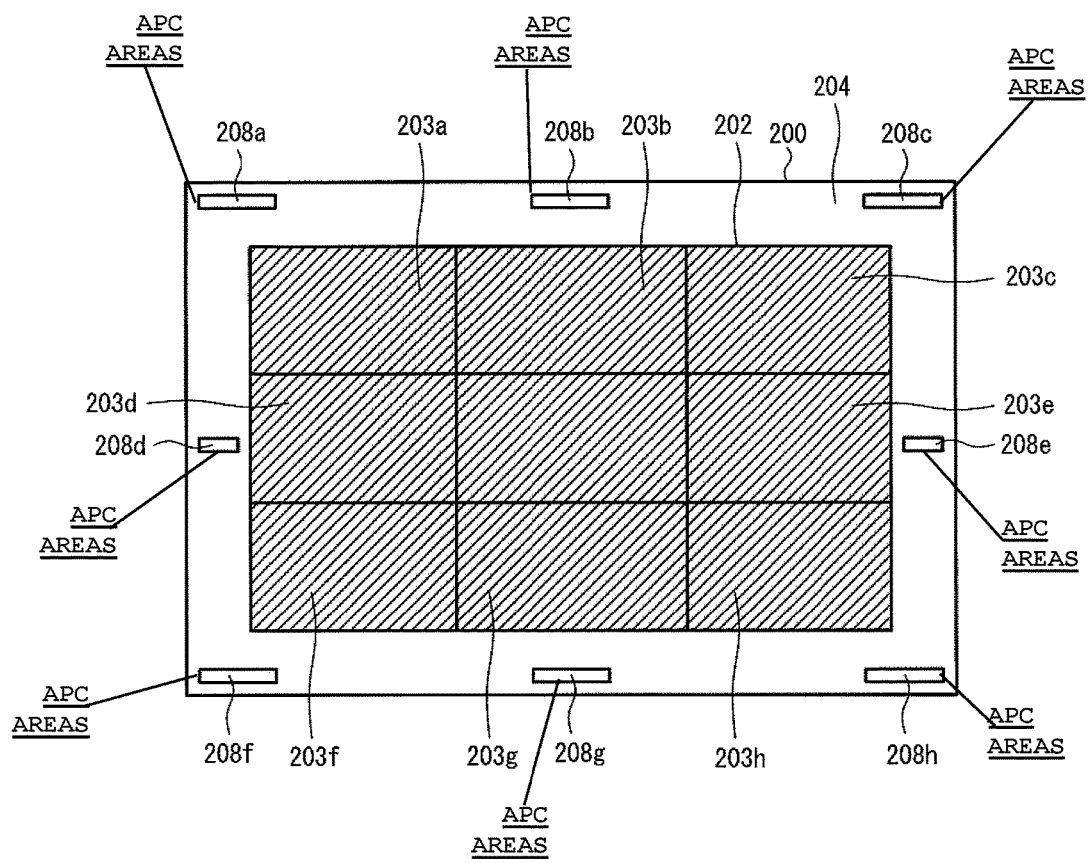
FIG. 8 is a drawing schematically showing an example of divided areas and an example of APC areas according to the first exemplary embodiment of the present invention.

The processes from the steps S20 to S22 will be explained by referring to FIG. 8. FIG. 8 is a drawing schematically showing the divided areas that have been divided in the step S20 and the APC areas which are determined in the step S22. In FIG. 8, a frame image to be divided is replaced by the rendering area 202 in which the display image will be rendered.

In the process of the step S20, the brightness detecting unit 122 divides the frame image constituting the display image to be divided into nine images. These nine images are referred to as divided areas 203. In the process of the step S21, the brightness detecting unit 122 calculates a sum of the brightness of the divided areas 203a to 203h that are present on a circumference of the image to thereby obtain the brightness of each divided area.

In the process of the step S22, the output adjusting control unit 134 compares the brightness of the divided areas 203a to 203h to identify the most bright divided area and also determines vicinity of the most bright divided area as being the APC area. For example, when the divided area 203a is evaluated as being the most bright divided area, the APC area 208a is determined as being the APC area on which an APC operation is performed.

As shown in FIG. 8, APC areas 208a to 208h are set corresponding respectively to the divided areas 203a to 203h. Therefore, when any one of the divided areas 203a to 203h is evaluated as being the most bright divided area, the corresponding one of the APC areas 208a to 208h is determined as being the APC area on which the APC operation is performed.

As other forms of the step S11, a divided area having a large rendering area among the divided areas may be evaluated as being the divided area with high brightness instead of or in addition to performing the processes explained by referring to FIG. 7. When the image display apparatus 100 is used as a head up display, an entire area of the rendering area 202 will not be rendered, while a part of the rendering area 202 may be rendered. To be more specific, for example, when character information or symbol information is rendered, a background of the character information or the symbol information to be rendered may be in a range which will not be rendered by the laser beams. Determining the divided area having a large rendering area as being the divided area with high brightness is appropriate when characters and symbols are mainly rendered or when there is a small change in rendered images, according to the display image data.

Figure 9:
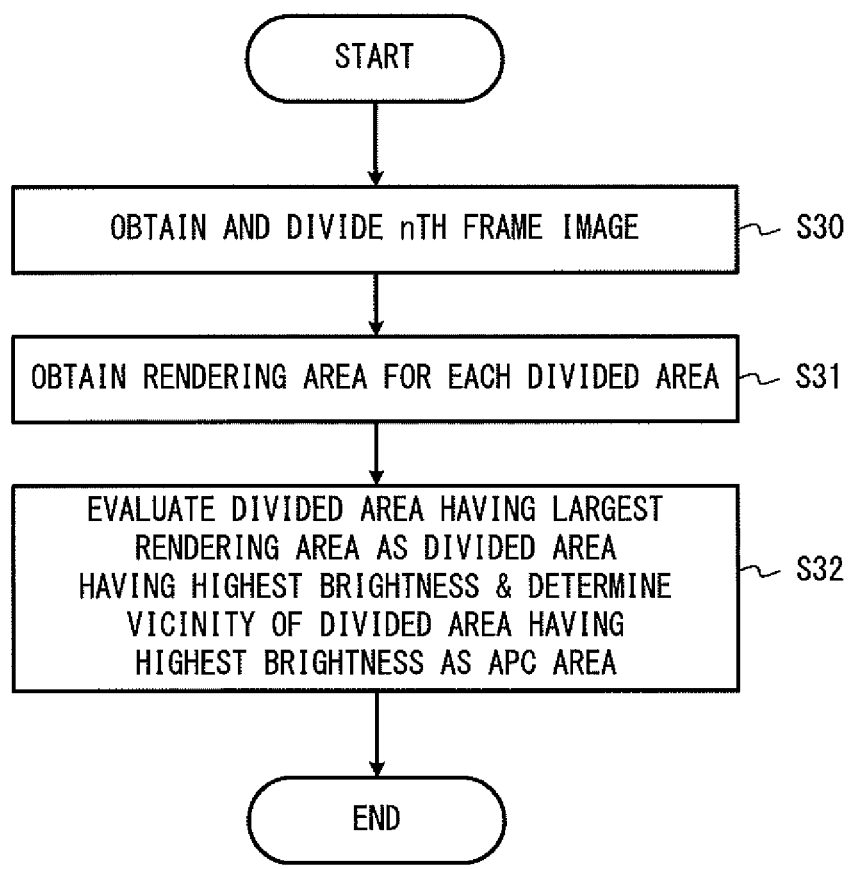
FIG. 9 is a flowchart for explaining another example of the APC area determining process performed by the image display apparatus according to the first exemplary embodiment of the present invention.

FIG. 9 is a drawing for explaining another processing example to determine the APC areas, and in a manner similar to the step S20 in FIG. 7, a frame image immediately after the timing at which APC is executed is obtained, and the frame image is divided into predetermined divided areas (step S30).

After the process of the step S30, the brightness detecting unit 122 obtains a rendering area for each of the divided areas (step S31). More specifically, the brightness detecting unit 122 recognizes as to whether or not the respective pixels constituting the display image include display information and calculates the number of pixels having the display information for each divided area. The pixels having the display information are pixels irradiated with the laser beams according to the display information. When the areas of the divided areas differ by each divided area, the number of pixels having the display information is divided by an area ratio of the divided area or the number of pixels constituting the divided areas in order to use the number of pixels having the display information for an appropriate comparison. Further, the number of pixels having the display information for each divided area indicates an image rendering area for the corresponding divided area.

Next, the output adjusting control unit 134 compares the image rendering areas in the respective divided areas obtained by the brightness detecting unit 122 in the process of the step S31, evaluates the divided area having the largest image rendering area as being the divided area with highest brightness, and determines the vicinity of the divided area having the highest brightness as being the APC area (step S32).

The process of the step S11 in FIG. 6 may be a process that combines the APC area determining process explained by referring to FIG. 7 and the APC area determining process explained by referring to FIG. 9. Moreover, the method for detecting the range with high brightness in the rendering area 202 is not necessarily limited to these processes.

Figure 10:
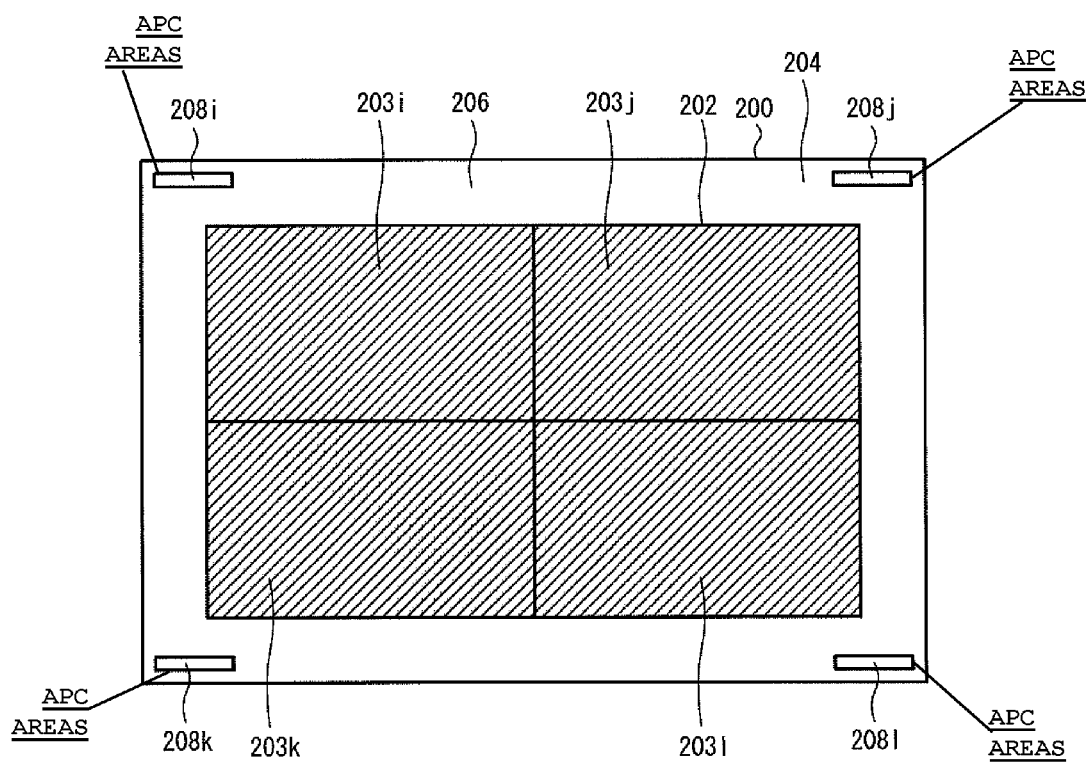
FIG. 10 is a drawing schematically showing another example of the divided areas and another example of the APC areas according to the first exemplary embodiment of the present invention.
Figure 11:
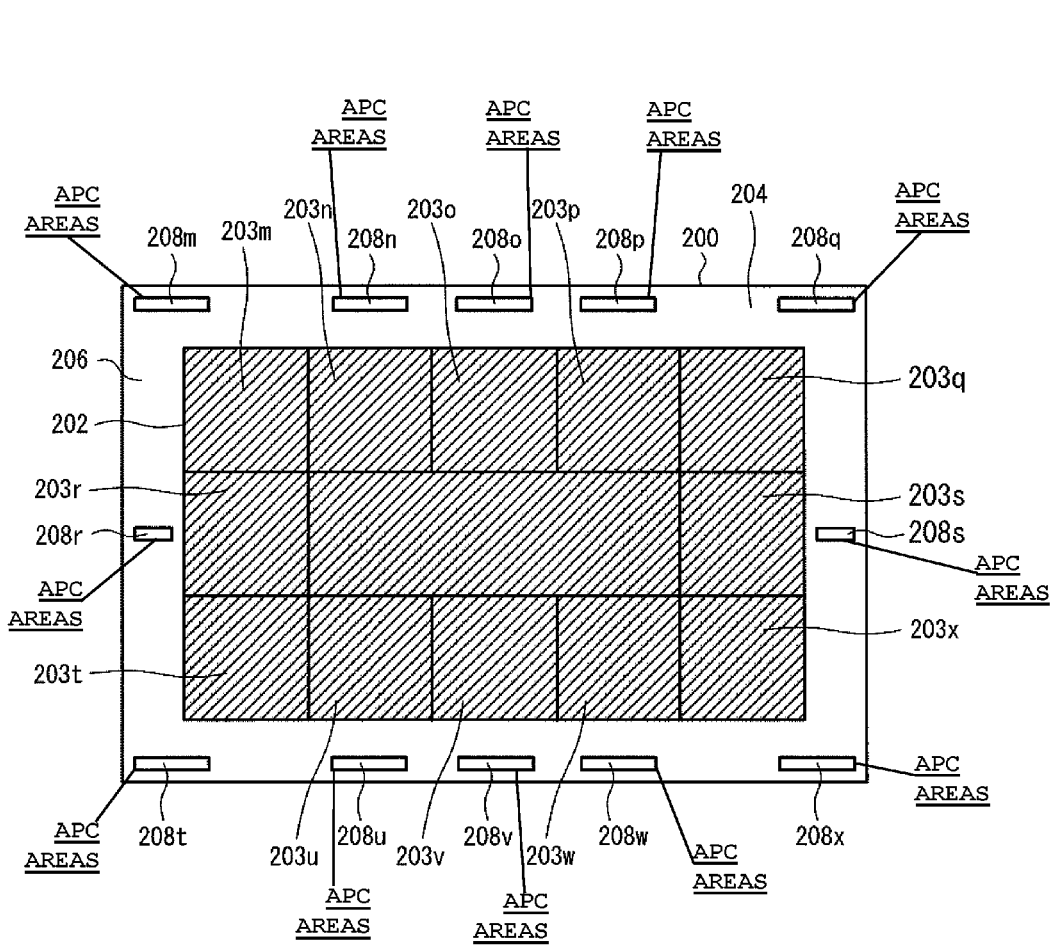
FIG. 11 is a drawing schematically showing another example of the divided areas and another example of the APC areas according to the first exemplary embodiment of the present invention.

FIGS. 10 and 11 are drawings schematically showing other examples of the divided areas and the APC areas. FIG. 10 shows a mode in which the frame image is divided into four, and APC areas 208i to 208l are set respectively corresponding to divided areas 203i to 203l. FIG. 11 shows an example in which only a peripheral part of the display image is set as the divided areas, and APC areas 208m to 208x respectively corresponding to divided areas 203m to 203x are set.

Although in FIGS. 8, 10, and 11, the shapes of the APC areas 208 are illustrated as rectangles, in practice, the APC areas 208 are ranges in which the laser beams are output along the scanning trajectories of the laser beams passing through the APC areas 208. Thus, the shapes of the APC areas 208 are not limited to rectangles.

Referring again to FIG. 6, after the APC areas are identified in the step S11, the output adjusting control unit 134 controls the laser driver 160 so that the red laser diode 162R outputs laser beams in the identified APC areas when an nth frame image in which the APC areas have been identified is scanned (step S12).

The laser beams of the red laser diode 162R that have been output in the step S12 are measured by the measuring unit 180, and the output adjusting control unit 134 obtains a measurement value of the red laser diode 162R (step S13).

As with the processes of the steps S12 and S13, the output adjusting control unit 134 obtains a measurement value of the green laser diode 162G when an n+1th frame image is scanned (steps S14 and S15). Likewise, the output adjusting control unit 134 obtains a measurement value of the blue laser diode 162B when an n+2th frame image is scanned (steps S16 and S17). The order of measurement of the respective colors of the laser diodes 162 is arbitrary.

In the processes from the step S12 to step S17, after the measurement values of the respective colors of the laser diodes 162 are obtained, the output adjusting control unit 134 controls the laser driver 160 so that the laser diodes 162 of the respective colors are driven by driving currents that enable light emission with an appropriate quantity of light based on the measurement values (step S18).

Figure 12:
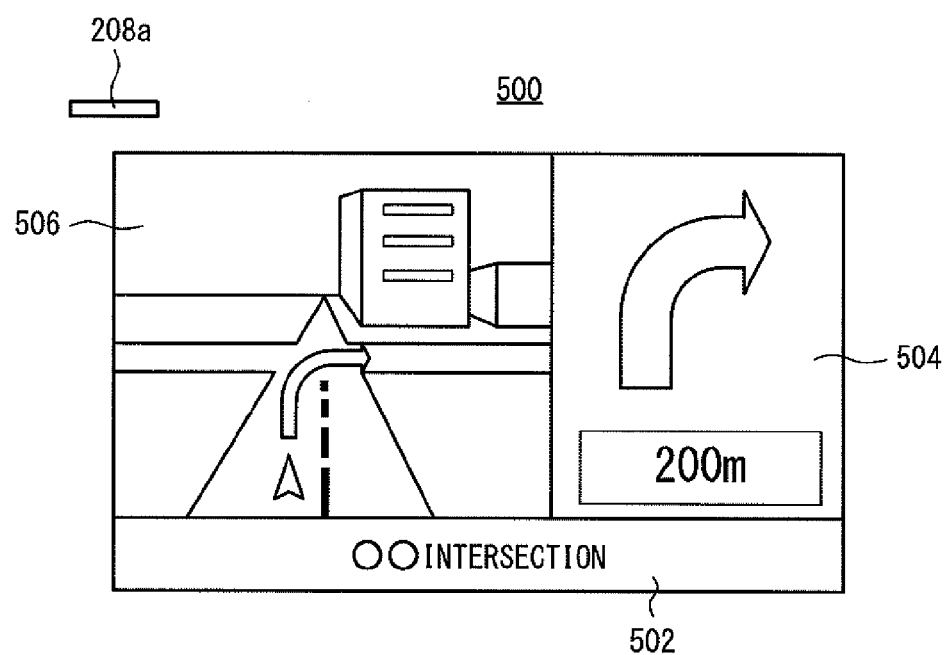
FIG. 12 is a drawing schematically showing a specific example of a display image and the APC area.

A specific example of the display image will be explained by referring to FIG. 12 based on the above explanation. FIG. 12 shows an example of a display image 500 intended for route guidance that is presented as a virtual image when the image display apparatus 100 according to the present invention is used as a head up display used for a vehicle. Such a display image 500 is supplied from a navigation apparatus to the image display apparatus 100.

The display image 500 exemplified in FIG. 12 includes a character display unit 502 that indicates point names which will be indicators according to a result of the route guidance, an arrow display unit 504 that indicates movement directions at the points which will be the indicators by symbols such as arrows, and a map display unit 506 that indicates the movement directions including the points which will be the indicators by superimposing the movement directions and the like on a map image.

When the display image 500 such as the one exemplified in FIG. 12 is presented as a virtual image by using the head up display, a background of character information on the character display unit 502 and a background of an arrow image on the arrow display unit 504 are often achromatic. That is, when lines and surfaces that constitute the character information and the arrow image are scanned by the laser beams, the laser beams are output only at the positions corresponding to the character information and the arrow image, while when the backgrounds are scanned by the laser beams, the laser beams will not be output.

As for the map display unit 506, lines and surfaces that indicate roads, surfaces that indicate ground other than the roads, surfaces that indicate the sky, and lines and surfaces that constitute buildings are often colored. When these components are scanned by the laser beams, the laser beams are output with appropriate brightness and colors.

Accordingly, when the display image 500 exemplified in FIG. 12 is associated with the divided areas 203 and the APC areas 208 shown in FIG. 8, a part that mainly constitutes the sky which is at the upper left part of the map display unit 506, that is the divided area 203a in FIG. 8, is evaluated as being the most bright. Therefore, by the processes of the present invention, the processes of APC are performed using the APC area 208a corresponding to the divided area 203a.

Figure 13:
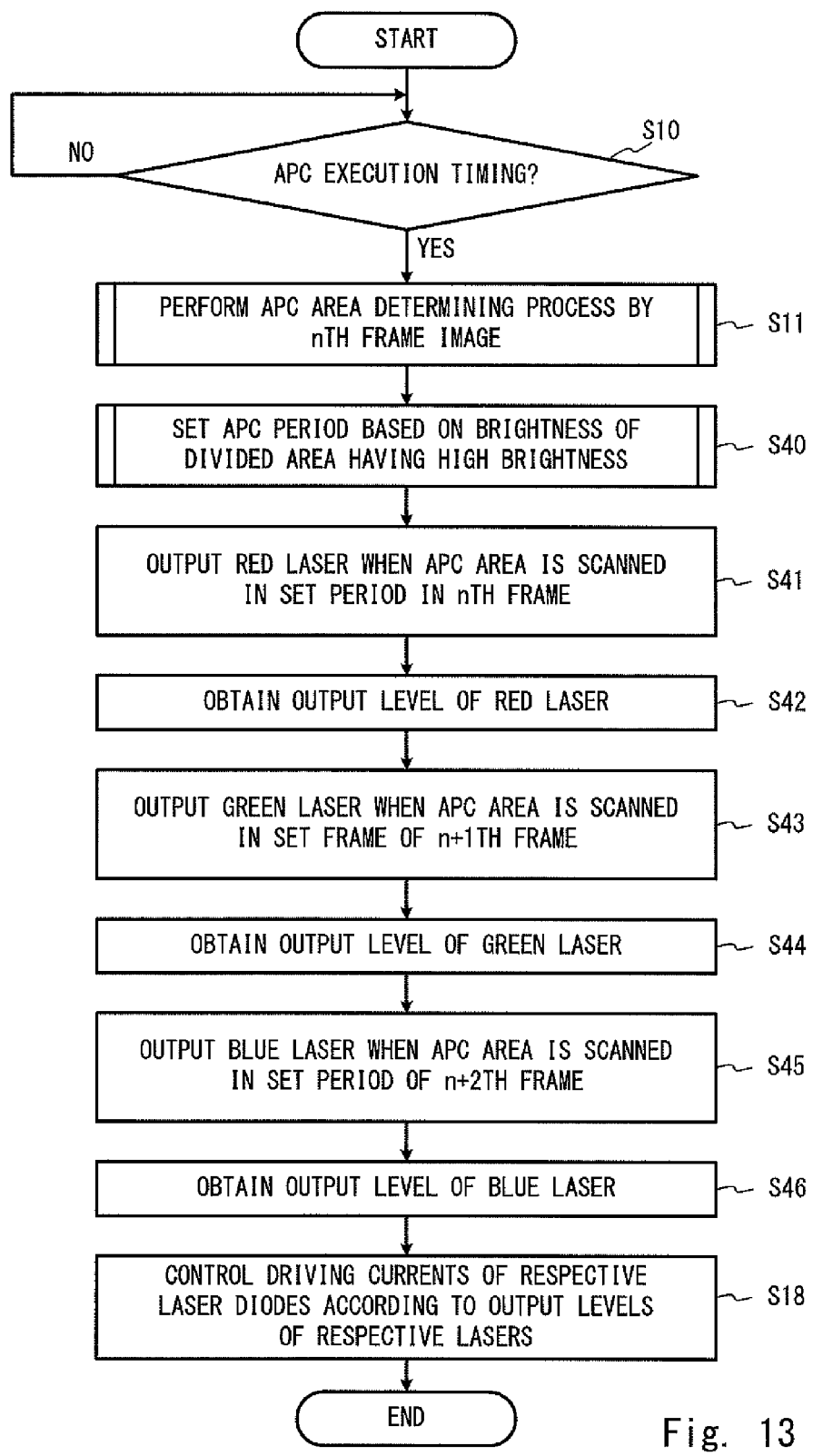
FIG. 13 is a flowchart for explaining a modified example of the output adjusting operation performed by the image display apparatus according to the first exemplary embodiment of the present invention.

Next, a modified example of the operation of APC according to the first exemplary embodiment will be explained by referring to FIGS. 13 to 15. FIG. 13 is a flowchart for explaining the modified example of the operation of APC performed by the image display apparatus 100.

Firstly, the output adjustment control unit 134 evaluates as to whether or not it is a timing at which APC is executed (step S10) and determines the APC areas according to a result of detection by the brightness detecting unit 122 which is based on the frame image (an nth frame image) that constitutes the display image displayed at the APC execution timing (step S11). The processes from the steps S10 to S11 are the same as those explained by referring to FIG. 6.

Next, the output adjusting control unit 134 sets an APC period based on brightness information of the APC areas that have been determined in the step S11 (step S40). An example of the process of the step S40 is shown in FIG. 14.

Firstly, the output adjusting control unit 134 calculates a sum of brightness of the divided area having the highest brightness that has been determined in the step S11 (step S50). The process of the step S50 may use the values calculated in the process of the step S21 shown in FIG. 7.

Next, the output adjusting control unit 134 compares the sum of brightness obtained in the step S50 with a previously set threshold and evaluates as to whether the sum of the brightness is greater or less than the threshold (steps S51 and S52). In this exemplary embodiment, although first and second thresholds are used, thresholds used for the comparison may be a single threshold or more than one thresholds. In addition, the threshold may be a fixed value or a variable value corresponding to an quantity of light outside the image display apparatus 100.

Figure 14:
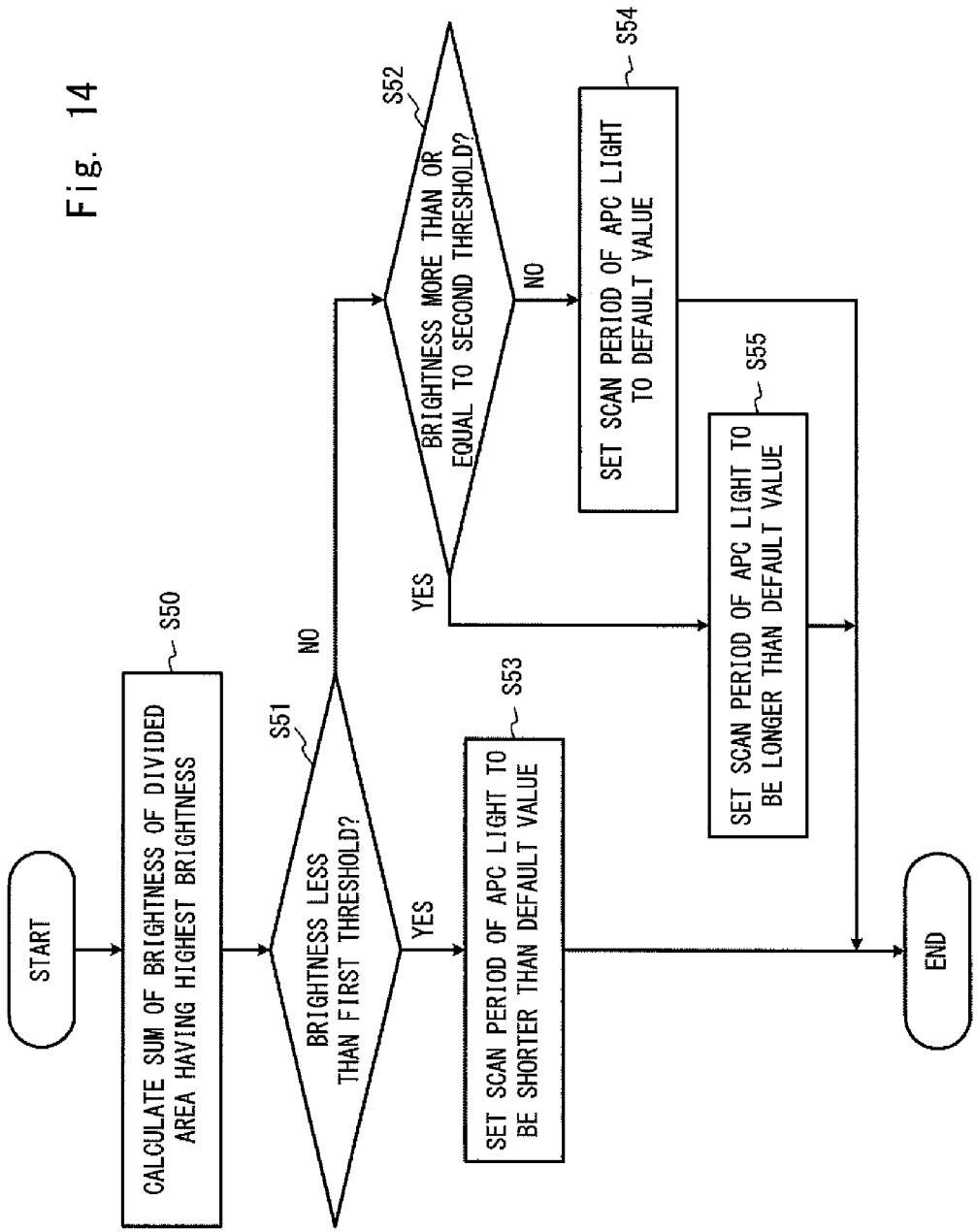
FIG. 14 is a flowchart for explaining the modified example of the output adjusting operation performed by the image display apparatus according to the first exemplary embodiment of the present invention.

In the example shown in FIG. 14, the first and second thresholds are used, and when the sum of the brightness of the divided area having the highest brightness is less than the first threshold, a period in which APC light is emitted is set to be shorter than a default value (step S53). When the sum of the brightness of the divided area having the highest brightness is more than or equal to the first threshold and also less than the second threshold, the period in which the APC light is emitted is set to the default value (step S54), while when the sum of the brightness of the divided area having the highest brightness is greater than or equal to the second threshold, the period in which the APC light is emitted is set to be longer than the default value (step S55).

Referring again to FIG. 13, in a manner similar to the processes from the steps S12 to S17 in FIG. 6, in the processes from the steps S41 to S48, each of the laser diodes 162 is controlled to output laser beams in the identified APC areas, and the output adjusting control unit 134 obtains the measurement values of the laser diodes 162. At this time, output periods of the respective laser diodes 162 are the periods set in the step S40.

Figure 15A:
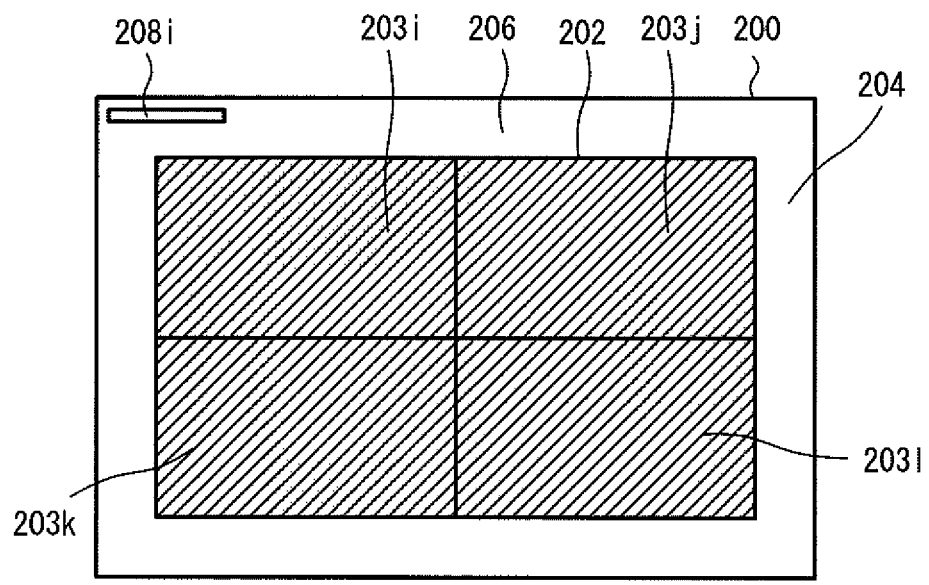
FIG. 15A is a drawing schematically showing an example of the APC areas in the modified example of the output adjusting operation according to the first exemplary embodiment of the present invention.
Figure 15B:
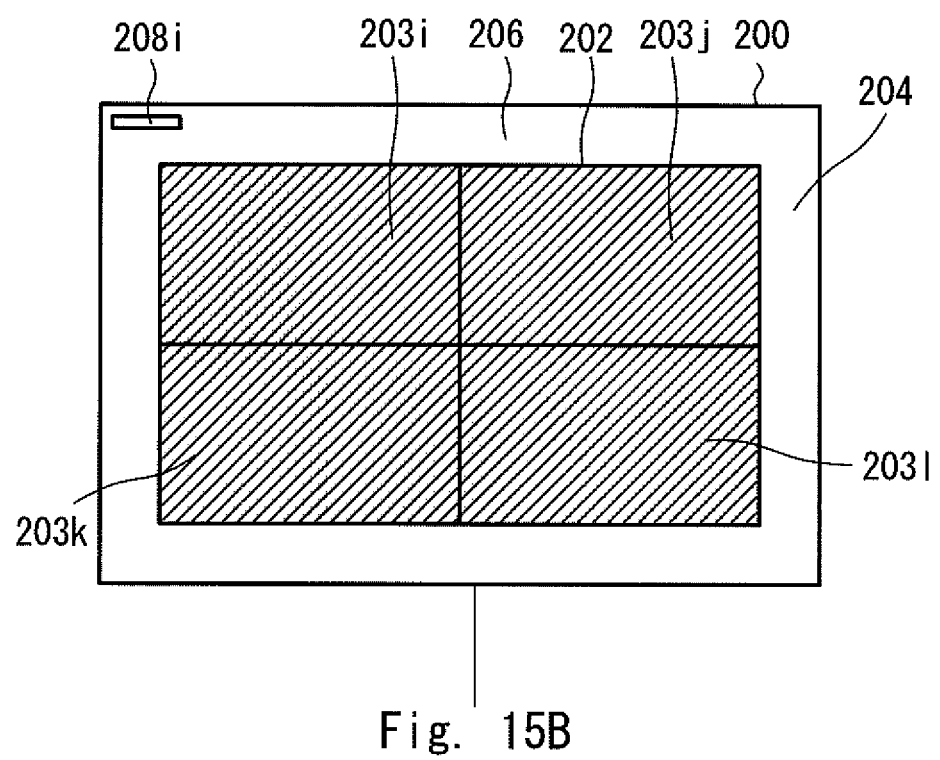
FIG. 15B is a drawing schematically showing an example of the APC areas in the modified example of the output adjusting operation according to the first exemplary embodiment of the present invention.
Figure 15C:
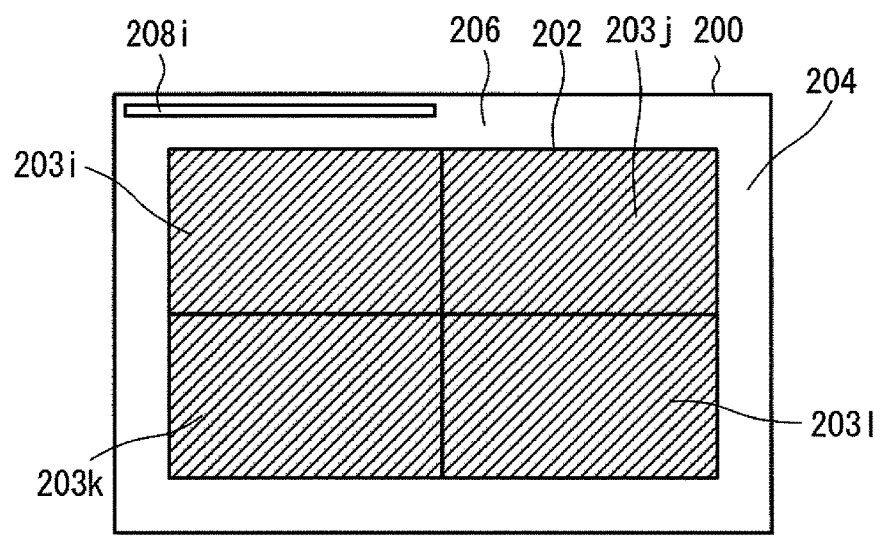
FIG. 15C is a drawing schematically showing an example of the APC areas in the modified example of the output adjusting operation according to the first exemplary embodiment of the present invention.

FIGS. 15A, 15B, and 15C show examples of light emission performed in the processes of the steps S41, S43, and S45 shown in FIG. 13 in the APC periods that have been set in the process of the step S40. The examples shown in FIGS. 15A, 15B, and 15C are examples in which the divided area having the highest brightness is evaluated as being the divided area 203i, and the APC area on which the APC operation is performed is determined as being the APC area 208i.

FIG. 15A shows an example of the APC area 208i in which a scan period of the APC light in the processes shown in FIG. 14 is set to the default value. The scan period of the APC light that has been set in this example is such a period that stray light of the APC light will not influence on vicinity of the divided area 203i having the highest brightness and other divided areas in a horizontal direction amplitude in which the horizontal scan mirror 178 scans.

FIG. 15B shows an example of the APC area 208i when the scan period of the APC light is set to be shorter than the default value in the process shown in FIG. 14. In this case, although the divided area having the highest brightness is evaluated as being the divided area 203i, as the display image of the entire rendering area 202 is a dark image, the scan period of the APC light is set to be short. By such processes, as a period in which the APC light is emitted is set to be short when a dark video that could increase the influence of the stray light of the APC light is rendered, the influence of the stray light of the APC light can be further reduced.

FIG. 15C shows an example of the APC area 208i when the scan period of the APC light is set to be longer than the default value in the process shown in FIG. 14. In this case, as the divided area having the highest brightness is evaluated as being the divided area 203i, and at least the brightness of the divided area 203i is higher than that of a normal divided area, the scan period of the APC light is set to be longer. By such processes, as a period in which the APC light is emitted is set to be long when a bright video that could reduce the influence of the stray light of the APC light is rendered, measurement accuracy of the APC light can be improved while keeping the influence of the stray light of the APC light to be small.

Next, a second exemplary embodiment of the present invention will be described. In the following description of the second exemplary embodiment, the same configurations and processes as those in the first exemplary embodiment will not be described as appropriate.

Figure 16:
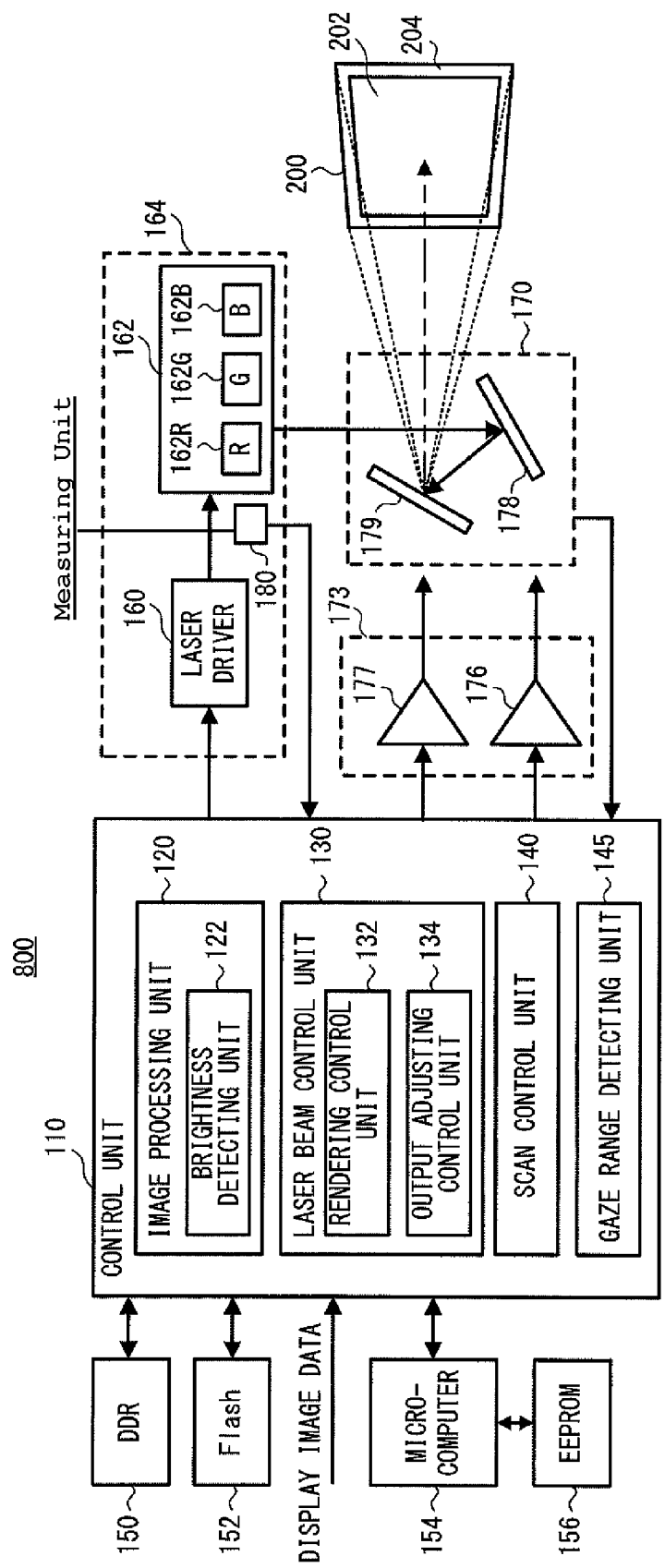
FIG. 16 is a block diagram showing a configuration of an image display apparatus according to a second exemplary embodiment of the present invention.

FIG. 16 is a block diagram showing a configuration of an image display apparatus 800 according to the second exemplary embodiment of the present invention. Specifically, the image display apparatus 800 is a head up display apparatus. Hereinafter, components of the image display apparatus 800 that are different from those of the image display apparatus 100 according to the first exemplary embodiment shown in FIG. 1 will be described.

The control unit 110 includes the image processing unit 120, the laser beam control unit 130, the scan control unit 140, and a gaze range detecting unit 145 as functions operated by a program.

The functions of the image processing unit 120 and the scan control unit 140 are same as those in the first exemplary embodiment. In the control for executing APC, the output adjusting control unit 134 included in the laser beam control unit 130 as a function of the laser beam control unit 130 controls the laser driver 160 to output the laser beams for APC at positions that are distant from a range with a high degree of gaze that has been detected by the gate range detecting unit 145, in addition to performing the process of controlling the laser driver 160 to output the laser beams for APC in the blanking area 204 that is outside a range in which the display image is rendered in the scan range 200 of the scan mirror unit 170.

The gaze range detecting unit 145 detects the range with a high degree of gaze from the image data input from the DDR memory 150. To be more specific, the gaze range detecting unit 145 partitions the image data and obtains degree of gaze parameters that are defined for respective components in each of the partitioned images to thereby detect a partition with high degree of gaze. Other possible methods of the process to detect a gaze range performed by the gaze range detecting unit 145 will be described later in detail.

Next, an operation of the APC control performed by the output adjusting control unit 134 will be explained by referring to FIGS. 17 to 22.

Figure 17:
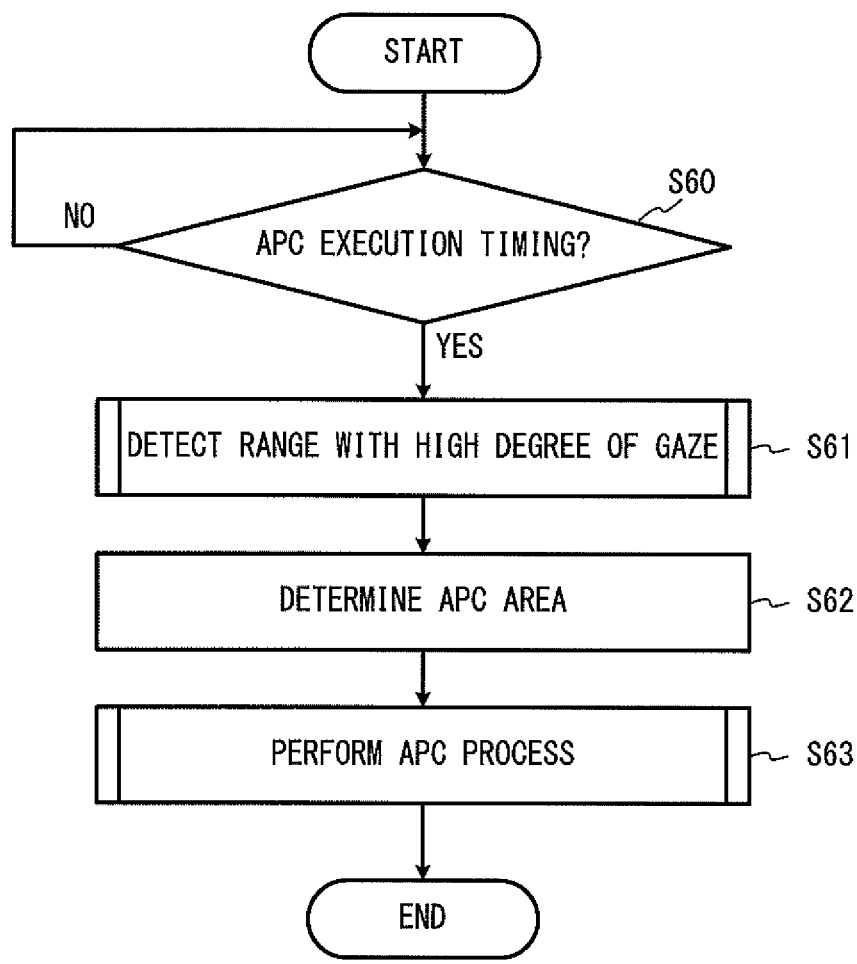
FIG. 17 is a flowchart for explaining an output adjusting operation performed by the image display apparatus according to the second exemplary embodiment of the present invention.

FIG. 17 is a flowchart for explaining the operation of APC performed by the image display apparatus 800. Firstly, the output adjusting control unit 134 evaluates as to whether or not it is a timing at which APC is executed (step S60). The timing at which APC is executed is arbitrary. To be more specific, APC is executed every predetermined time or every predetermined frame while an image is being displayed. The predetermined time and the predetermined frame are, for example, every 60 seconds and every 3600 frames, respectively. In addition, APC may be executed when the image display apparatus 800 is started. The timing when the image display apparatus 800 is started is a timing when adjustment by APC is most needed, for example, when a temperature of a usage environment of the image display apparatus 800 is low.

In the step S60, when it is evaluated that it is not a timing to execute APC (step S60: No), an evaluation in the step S60 is executed again. After the evaluation in the step S60 is determined to be No, a step for evaluating as to whether or not a predetermined time has passed may be included depending on setting of timings at which APC is executed. Alternatively, when the timing at which APC is executed is set after the image display apparatus 800 is started, the process of the step S60 may be skipped, and processes from the step S61 onward may be executed after the image display apparatus 800 is started.

In the step S60, when it is evaluated that it is a timing at which APC is executed (step S60: Yes), the gaze range detecting unit 145 detects the range with a high degree of gaze based on a frame image (an nth frame image) that constitutes the display image displayed at an APC execution timing (step S61).

Figure 18:
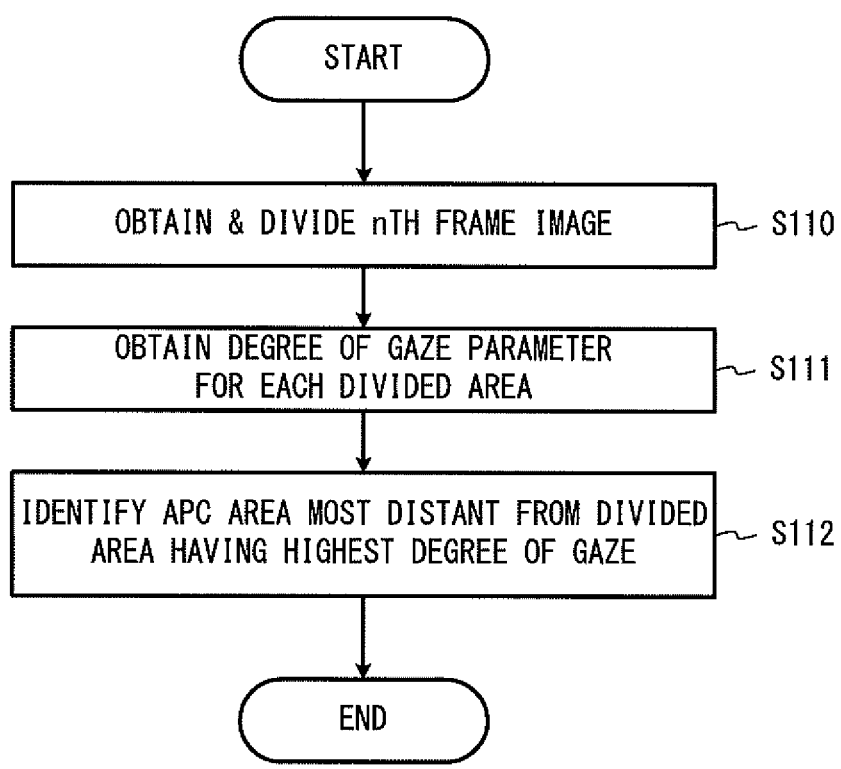
FIG. 18 is a flowchart for explaining an APC area identifying process performed by the image display apparatus according to the second exemplary embodiment of the present invention.

An example of the process of the step S61 will be described by referring to FIGS. 18 to 21. FIG. 18 is a flowchart of an example of the process for detecting the range with a high degree of gaze in the step S61.

In FIG. 18, the gaze range detecting unit 145 obtains a frame image immediately after the timing at which APC is executed in the step S60 and divides the frame image into predetermined divided areas (step S110). Although the divided areas divided in the process of the step S110 is performed according to a predetermined division mode, the division mode may be changed as appropriate according to contents of the display image.

Figure 19:
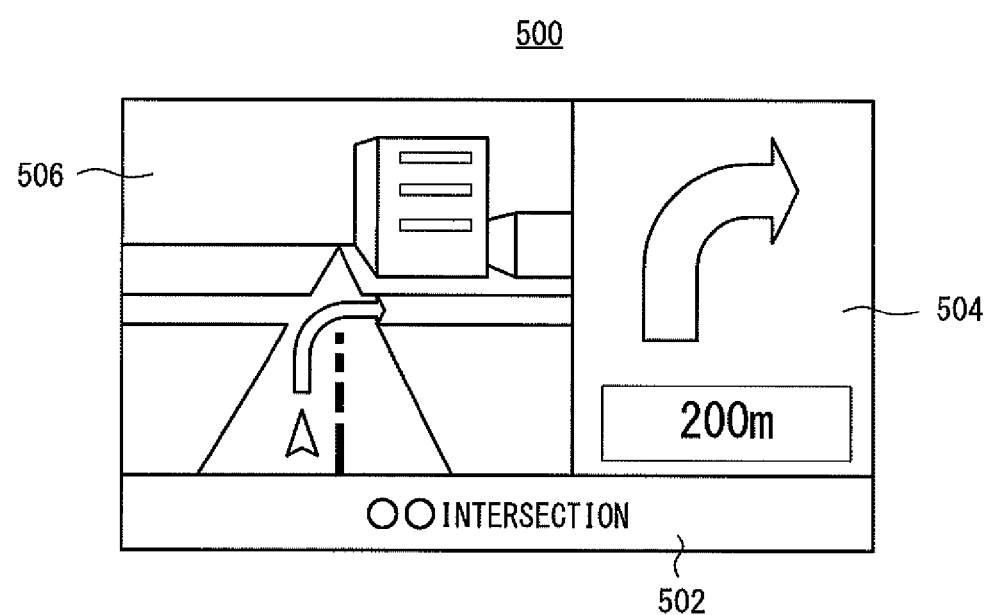
FIG. 19 is a drawing showing a specific example of a display image.
Figure 20:
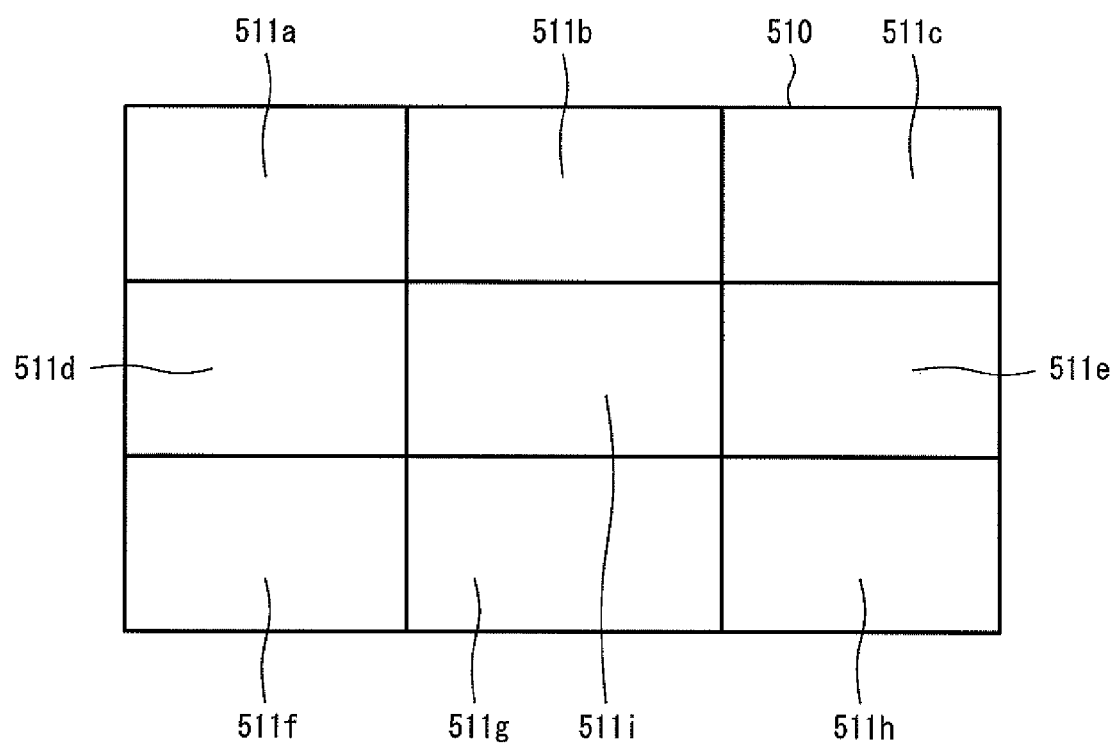
FIG. 20 is a drawing schematically showing another example of divided areas according to the second exemplary embodiment of the present invention.

FIG. 19 is an example of a specific display mode for explaining the process of the step S61. A display image 500 exemplified in FIG. 19 includes the character display unit 502 that indicates point names which will be indicators according to a result of route guidance, the arrow display unit 504 that indicates movement directions at the points which will be the indicators by symbols such as arrows, and the map display unit 506 that indicates the movement directions including the points which will be the indicators by superimposing the movement directions and the like on a map image. The gaze range detecting unit 145 divides display partitions constituting such a display image 500 as divided areas. Thus, the display image 500 in FIG. 19 is divided into the character display unit 502, the arrow display unit 504, and the map display unit 506.

After the process of the step S110, the gaze range detecting unit 145 obtains the degree of gaze parameters defined for respective components included in the image of each divided areas that is obtained by the division in the process of the step S110 (step S111). The degree of gaze parameters in this exemplary embodiment are parameters previously defined for the respective components of the image based on an importance that a user can visually recognize and visibility.

As in an example of the display mode shown in FIG. 19, when the display image 500 includes a plurality of sections, the degree of gaze parameter obtained in the step S111 is set for each of the plurality of sections. The degree of gaze parameters are set based on, for example, an importance or visibility of display contents for the respective sections.

The reason to set the degree of gaze parameters based on the importance of the display contents is that a frequency that the user gazes important information is high, and the important information tends to attract user's attention. Therefore, a range indicating important information is set to the range with a high degree of gaze, and the APC area is set at a position distant from the range having the high degree of gaze, so that the user does not easily notice stray light of the APC light.

The reason to set the degree of gaze parameters based on the visibility of the display contents is that information with high visibility requires a short time for the user to recognize the information, and the greater the display area or the more complicated the contents to be displayed, the longer the time required for the user to recognize the information, and the information with high visibility tends to attract user's attention. Therefore, when a range that requires some time for the user to recognize the information is set to the range having the high degree of gaze, and the APC area is set at a position distant from the range having the high degree of gaze, the user does not easily notice the stray light of the APC light.

Setting of the degree of gaze parameters is not limited to be based on the importance and visibility of the display contents and may be based on parameters of other elements. A parameter that combines a plurality of elements may be used. Although the degree of gaze parameters are represented by characters and numeric values indicating levels such as "high", "middle", and "low", or "3", "2", and "1" in the following example, the degree of gaze parameters may be represented by other forms and the level is not limited to three.

Next, an example of setting the degree of gaze parameters based on the importance of the display contents will be explained by referring to the display image 500 shown in FIG. 19. In the example of the display image 500 shown in FIG. 19, as information shown in the arrow display unit 504 is information that needs to be delivered to the user who is a driver having the highest priority at the time when the information is displayed, the degree of gaze of the information indicated by the arrow display unit 504 is set to "high" or "3". Further, as the information indicated by the map display unit 506 is detailed information including surrounding information of the information indicated by the arrow display unit 504, the importance of the information indicated by the map display unit 506 is lower than that of the information indicated by the arrow display unit 504. However, as it is the information necessary to recognize a peripheral state around intersections, the degree of gaze of the information indicated by the map display unit 506 is set to "middle" or "2". Furthermore, as the information indicated by the character display unit 502 is the information that supplements the information indicated by the arrow display unit 504 and the information indicated by the map display unit 506, the importance of the information indicated by the character display unit 502 is lower than that of the information indicated by the arrow display unit 504 and the map display unit 506. Thus, the degree of gaze of the information indicated by the character display unit 502 is set to "low" or "1".

Similarly, a setting example of the degree of gaze parameters based on the visibility of the display contents will be explained using the display image 500 shown in FIG. 19. In the example of the display image 500 in FIG. 19, when the user who is a driver views the display image 500 presented as a virtual image on a head up display while the user is driving, an area on which the information indicated by the arrow display unit 504 is displayed is large, and an amount of displayed information is small. Thus, the user can visually recognize the display contents in a short time, and the degree of gaze of such information is set to "low" or "1". Moreover, an area on which the information indicated by the character display unit 502 is displayed is small, and the display contents are less complicated. However, as it is the character information that requires the user to take more time to recognize the information than the user does to recognize the information indicated by the arrow display unit 504, the degree of gaze of such information is set to "middle" or "2". In addition, an area on which the information indicated by the map display unit 506 is displayed large, however, an amount of the information is large, and the display contents are complicated. Thus, as it takes more time for the user to recognize such information than the user does to recognize the information indicated by the arrow display unit 504 and the information indicated by the character display unit 502, the degree of gaze of such information is set to "high" or "3".

A setting example of the degree of gaze parameters based on the combination of the importance and visibility of the display contents will be described by referring to the display image 500 shown in FIG. 19. In the arrow display unit 504, as the degree of gaze based on the importance is "3", and the degree of gaze based on the visibility is "1", the sum of the degrees of gaze is "4". Similarly, the sum of the degrees of gaze for the map display unit 506 is "5", and the sum of the degrees of gaze for the character display unit 502 is "3".

Another example of an element used to set the degree of gaze parameter is, for example, display information density for each divided area. In this case, the higher the display information density, the higher the degree of gaze which will be set. Other examples of elements used to set the degree of gaze parameter are a frequency of movement or magnitude of the movement per unit time of the information to be displayed. In this case, the higher the frequency and the magnitude of the movement of the information, the higher the degree of gaze which will be set. When a plurality of components are included in one divided area, the degree of gaze is calculated for each of the components, and an average value or a sum of the degrees of gaze for each divided area may be used as the degree of gaze of the corresponding divided area.

Similarly, another example of the process of the step S61 may be that images for a plurality of frames are referred for each of the divided areas, the divided area having great magnitude of the movement across the plurality of frames is set for the divided area with a high degree of gaze, and the divided area with small magnitude of the movement is set for the divided area with a low degree of gaze.

The division of the image performed by the gaze range detecting unit 145 is not limited to the division into respective display sections as shown in FIG. 19. The division of the image performed by the gaze range detecting unit 145 may be based on a previously defined division size, such as division into nine sections. In an example of FIG. 20, a display image 510 is divided into nine sections which are divided areas 511a to 511i. In this case, among the nine sections, the degree of gaze parameters are obtained from the divided areas 511a to 511h.

Next, the gaze range detecting unit 145 finds the divided area having the highest degree of gaze parameter obtained in the process of the step S111 and identifies the APC area that is most distant from the divided area having the highest degree of gaze parameter (step S112). It is appropriate to set the APC area positioned near the divided area that is line-symmetric or point-symmetric to the divided area having the highest degree of gaze parameter for the APC area that is most distant from the divided area having the highest degree of gaze parameter.

Figure 21:
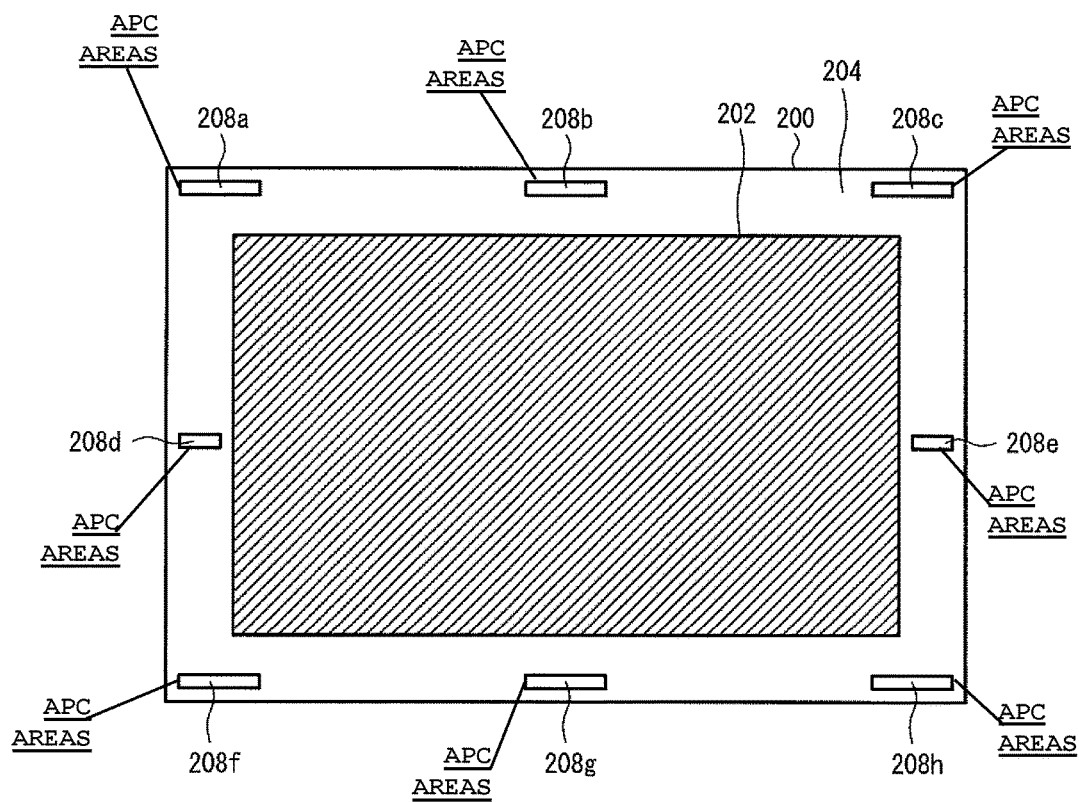
FIG. 21 is a drawing schematically showing an example of arrangement of APC areas according to the second exemplary embodiment of the present invention.

FIG. 21 is a drawing showing an example of an arrangement of a plurality of APC areas 208 that are set in the blanking area 204. In the example of FIG. 21, in the blanking area 204, the plurality of APC areas 208 are set around the rendering area 202 in which the display image is rendered. In this case, the APC area 208f that is most distant from the position where the map display unit 506 exemplified in FIG. 19 is rendered is set for the APC area used to adjust the output of laser beams. As an example of an evaluation process for the APC area 208 that is most distant from the map display unit 506, a coordinate which will be a central point of the map display unit 506 is calculated, and the evaluation is made based on the distance between the central point of the map display unit 506 and coordinates indicating the plurality of APC areas shown in FIG. 21. However, the method is not particularly limited.

Further, when there are a plurality of divided areas with high degrees of gaze parameters, center of gravity of the plurality of divided areas having high degrees of gaze parameters is used as a reference, and an APC area that is most distant from the reference may be set for the APC area used to adjust the output of the laser beams.

Although it has been explained that the positions of the plurality of the APC areas 208 are previously set, and the position of the APC area 208 is selected from among the plurality of APC areas 208 in the process of the step S112, the positions of the APC areas may not be previously set, and the APC area 208 may be set at appropriate positions as appropriate.

When the process of the step S112 is applied to the display image 500 exemplified in FIG. 19, the APC area 208f is identified as being the APC area that is most distant from the map display unit 506 having the degree of gaze parameter of "high".

Referring again to FIG. 17, the output adjusting control unit 134 determines the APC area that has been identified by the gaze range detecting unit 145 in the process of the step S61 as being the APC area to adjust the output of the laser beams (step S62) and executes the APC process using the APC area determined in the step S62 (step S63).

Figure 22:
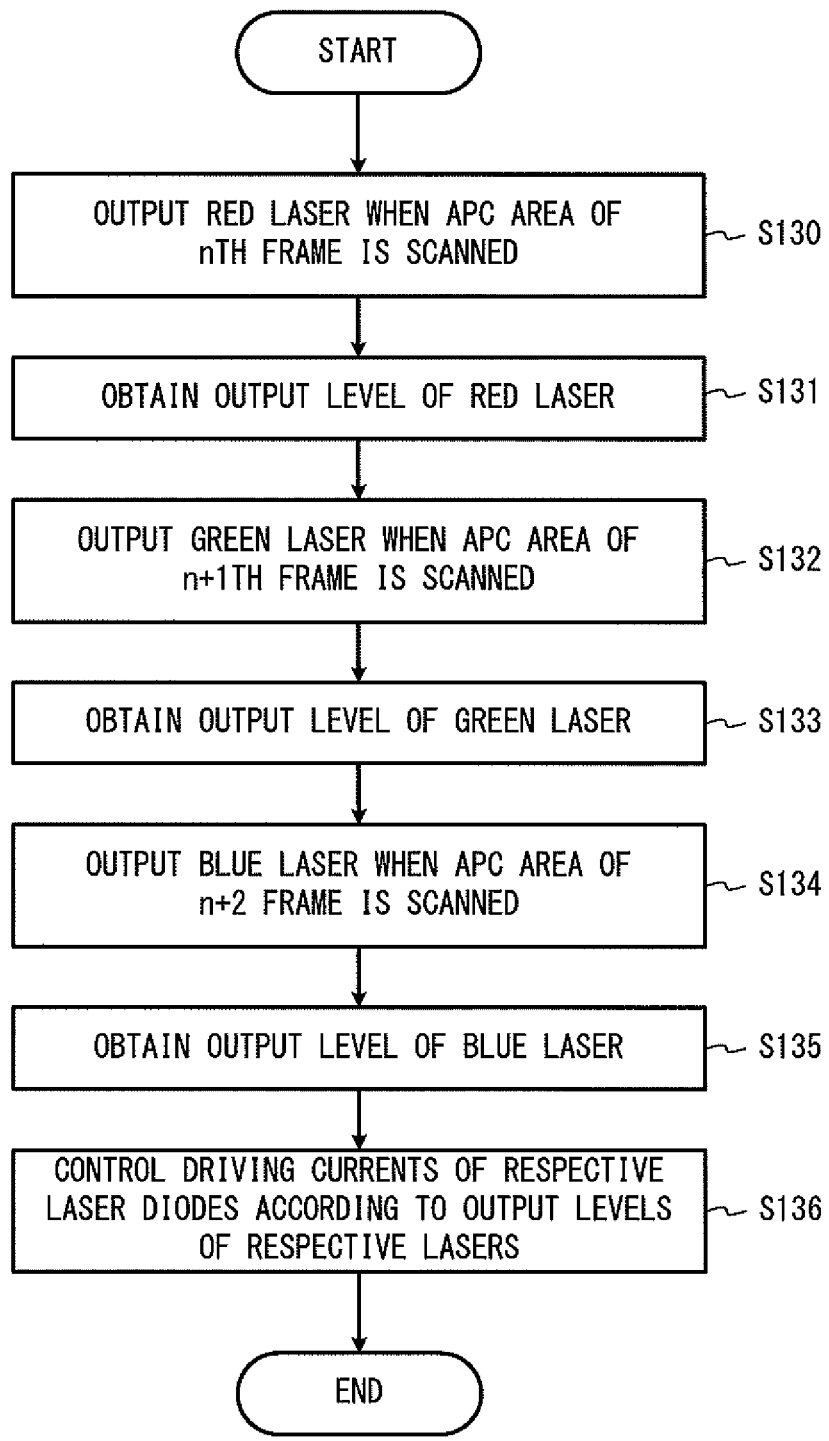
FIG. 22 is a flowchart for explaining an example of the APC process according to the second exemplary embodiment of the present invention.

Although an example of the process of the step S63 is shown in FIG. 22, as the steps S130 to S136 in FIG. 22 are the same as the steps S12 to S18 in FIG. 6 according to the first exemplary embodiment, descriptions of the steps S130 to S136 will be omitted.

By performing the above processes explained in the first and second exemplary embodiments, the image display apparatuses 100 and 800 according to the present invention can reduce the influence of the stray light on the image to be rendered even during the APC operation so that the user does not easily notice the influence of the stray light.

The present invention is not limited to the above exemplary embodiments, and modifications can be made as appropriate without departing from the scope of the invention. Although it has been explained that the display image formed of a plurality of frame images is assumed to be a still image, the display image may be a moving image formed of a plurality of frame images. In such a case, the brightness detecting unit 122 and the gaze range detecting unit 145 respectively obtain the accumulated brightness and accumulated degrees of gaze for each divided area for all frames constituting the moving image in a predetermined period.

Moreover, in the above exemplary embodiments, the scan mirror unit 170 includes the vertical scan mirror 179 and the horizontal scan mirror 178 and is configured to be driven by the driving signals of the vertical scanner driver 177 and the horizontal scanner driver 176. With such a configuration, the horizontal scan mirror 178 may be configured to self-oscillate the horizontal scanner driver 176. Further, the scan mirror unit 170 may use a single scan mirror to scan the horizontal and vertical directions.

Although the present invention has been explained by referring to the exemplary embodiments, the present invention is not limited by the above. Various modifications, obvious to those skilled in the art, can be made to the configurations and details of the present invention within the scope of the invention.

According to the present invention, it is possible to provide an image display apparatus and an image display adjusting method that can present high quality HUD display with an influence of stray light on images to be rendered being so small that it is unnoticeable to a user.

What is claimed is:

1. An image display apparatus comprising:
    a laser light source unit;
    a scan mirror unit configured to reflect laser beams output from the laser light source unit and scan the light beams;
    a rendering control unit configured to control the laser light source unit in such a way that a display image is rendered in a range being smaller than a scan range of the scan mirror unit based on input display image data;
    a detecting unit configured to detect a range to be a reference for setting a laser beam output position for adjusting an output of the laser beams based on the display image data; and
    an output adjusting control unit configured to control the laser light source unit in such a way that the laser beams for adjusting the output of the laser beams are output at a position outside the range where the display image is rendered in the scan range of the scan mirror unit, and the position being based on the range detected by the detecting unit.

2. The image display apparatus according to claim 1, wherein
    the detecting unit detects a range having high brightness of the display image based on the display image data, and
    the output adjusting control unit controls the laser light source unit in such a way that the laser beams for adjusting the output of the laser beams are output in vicinity of a range that is outside the range where the display image is rendered in the scan range of the scan mirror unit, and further, the range is having high brightness detected by the detecting unit.

3. The image display apparatus according to claim 2, wherein the detecting unit detects a range as the range having the high brightness where more area is rendered by the laser beams in the display image based on the display image data.

4. The image display apparatus according to claim 2, wherein the detecting unit partitions the display image into a plurality of areas and detects the range having the high brightness from among the plurality of areas based on brightness for each of the areas that are positioned at a side part of the display image.

5. The image display apparatus according to claim 2, wherein the output adjusting control unit changes an output period of the laser beams for adjusting the output of the laser beams in accordance with the brightness of the range detected by the detecting unit.

6. The image display apparatus according to claim 1, wherein
the detecting unit detects a range having a high degree of gaze in the display image based on the display image data, and
the output adjusting control unit controls the laser light source unit in such a way that the laser beams for adjusting the output of the laser beams are output at a position that is outside the range where the display image is rendered in the scan range of the scan mirror unit, and further, the position is distant from a range having the high degree of gaze detected by the detecting unit.

7. The image display apparatus according to claim 6, wherein the detecting unit detects the range with the high degree of gaze based on a component that constitutes the display image based on the display image data.

8. The image display apparatus according to claim 6, wherein the detecting unit detects the range with the high degree of gaze based on an importance of the component that constitutes the display image based on the display image data.

9. The image display apparatus according to claim 6, wherein the detecting unit detects the range with the high degree of gaze based on a visibility of the component that constitutes the display image based on the display image data.

10. The image display apparatus according to claim 1, further comprising an enclosure including an opening that is opened in a projection direction of the laser beams scanned by reflection of the scan mirror unit, wherein the enclosure passes the laser beams in the range where the display image is rendered in the scan range of the scan mirror unit through the opening, and the enclosure shields a range other than the range where the display image is rendered.

11. An image display adjusting method comprising:
a detecting step for detecting a range to be a reference for setting a laser beam output position for adjusting an output of the laser beams based on input display image data;
a rendering control step for controlling a laser light source unit in such a way that a display image is rendered in a range smaller than a scan range of a scan mirror unit configured to scan by reflecting laser beams output from the laser light source unit, based on the display image data; and
an output adjusting control step for controlling the laser light source unit in such a way that the laser beams for adjusting the output of the laser beams are output at a position outside the range where the display image is rendered in the rendering control step, and the position being based on the range detected in the detecting step.

* * * * *